United States Patent
Van De Mortel et al.

(10) Patent No.: US 8,517,066 B1
(45) Date of Patent: Aug. 27, 2013

(54) MULTI-AXIS CONTROLLED SELF-CLIMBING TREE TRIMMER

(75) Inventors: Mike Van De Mortel, Yorba Linda, CA (US); Christopher A. Hipwell, Torrance, CA (US)

(73) Assignee: Vandypalm, Inc., Irvine, CA (US)

( * ) Notice: Subject to any disclaimer, the term of this patent is extended or adjusted under 35 U.S.C. 154(b) by 0 days.

(21) Appl. No.: 13/591,131

(22) Filed: Aug. 21, 2012

(51) Int. Cl.
*A01G 23/095* (2006.01)

(52) U.S. Cl.
USPC ........................................ 144/24.13

(58) Field of Classification Search
USPC .................................. 144/208.2, 343, 24.13
See application file for complete search history.

(56) References Cited

U.S. PATENT DOCUMENTS

| | | | | |
|---|---|---|---|---|
| 2,477,922 | A * | 8/1949 | Emery et al. | 144/208.8 |
| 2,581,479 | A * | 1/1952 | Grasham | 47/1.01 R |
| 4,527,603 | A | 7/1985 | Hori | |
| 4,690,184 | A | 9/1987 | Fuminao | |
| 5,322,102 | A * | 6/1994 | Livingston | 144/24.13 |
| 5,524,685 | A | 6/1996 | Barnhill et al. | |
| 5,975,168 | A | 11/1999 | Ericksson | |
| 5,983,966 | A | 11/1999 | Clouston | |
| 6,474,377 | B1 | 11/2002 | Van De Mortel | |
| 6,672,346 | B1 | 1/2004 | Heckmaier | |
| 7,422,041 | B2 | 9/2008 | Smith et al. | |
| 7,997,311 | B2 | 8/2011 | Prout, Jr. | |
| 2007/0095430 | A1 * | 5/2007 | Uebergang | 144/208.2 |
| 2007/0181217 | A1 | 8/2007 | Ahdoot | |

* cited by examiner

*Primary Examiner* — Dana Ross
*Assistant Examiner* — Matthew G Katcoff
(74) *Attorney, Agent, or Firm* — Kilpatrick Townsend & Stockton LLP

(57) ABSTRACT

A multi-axis controlled self-climbing tree trimmer used for shaping and severing peripheral growth from a tree is provided herein. The trimmer typically includes a structural segment hinged together to form a rigid chassis that surrounds a tree trunk climbing segment and a trimming portion. The climbing portion is retained within the structural segment in the form of a number of inward-extending carriages containing one or more rollers for gripping the tree trunk during climbing, and the trimming portion may include a rotatable split ring gear containing centrifugally rotating trimming blade members and/or a cutting tool on a positionable arm. When rotated, the blade members unlatch and pivot, into the trunk of the tree to effect controlled trimming. The system may utilize a multi-axis control system that uses linear interpolation, circular interpolation and coordination of all axes to enable the trimmer to follow an XYZ contour selected by a user.

30 Claims, 20 Drawing Sheets

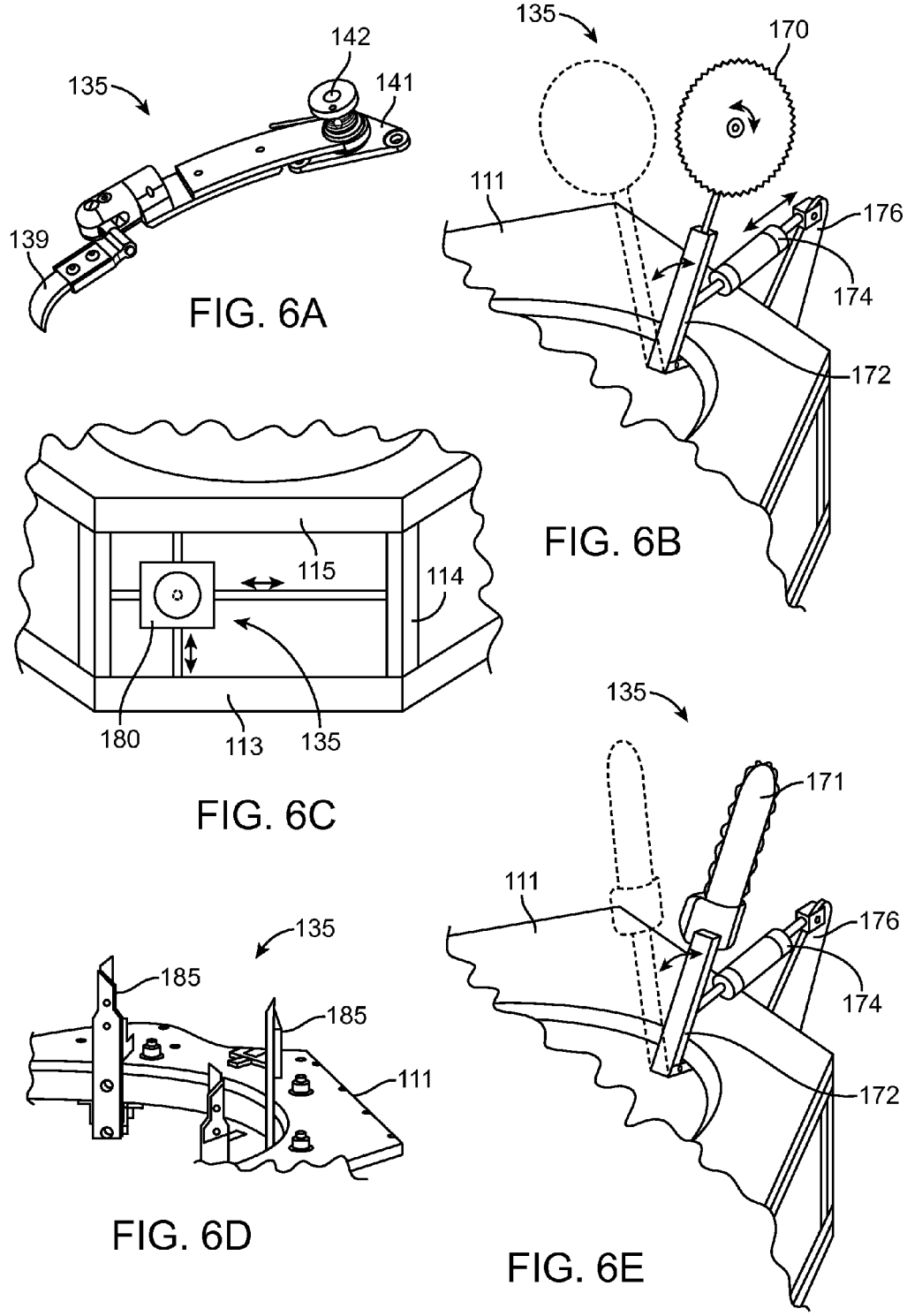

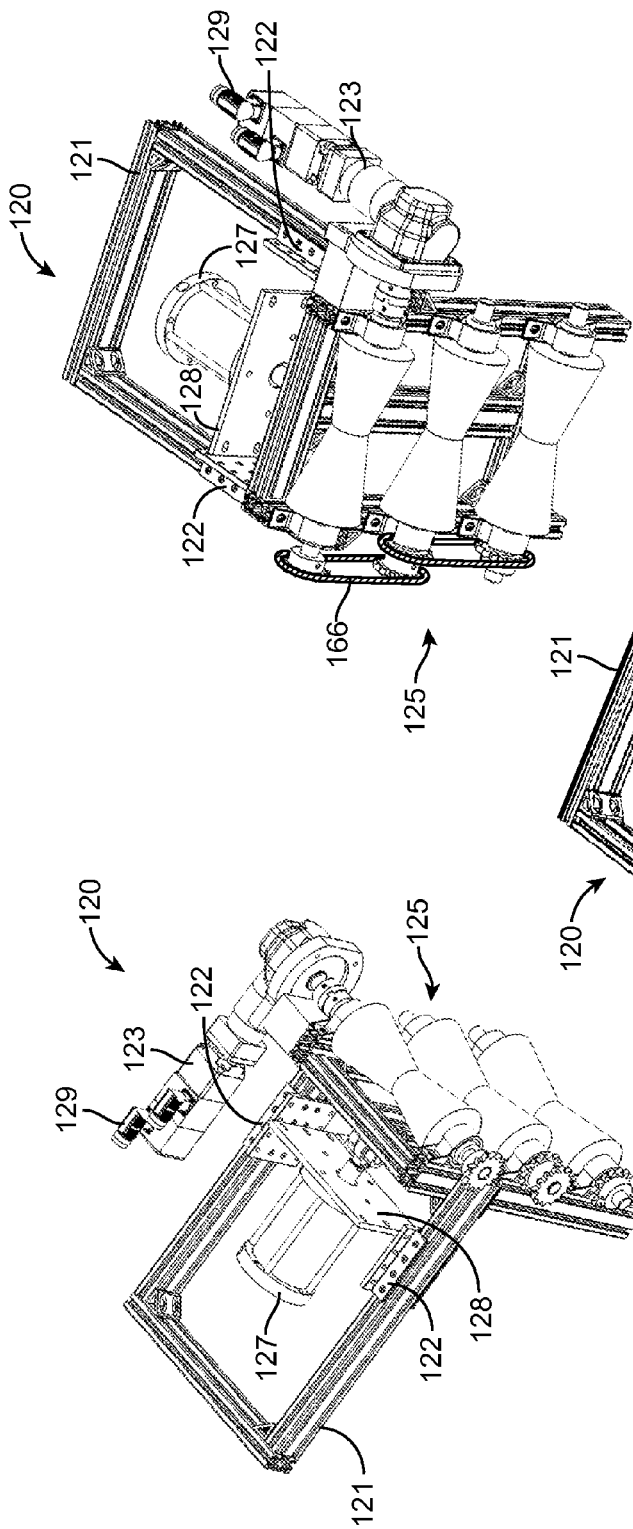
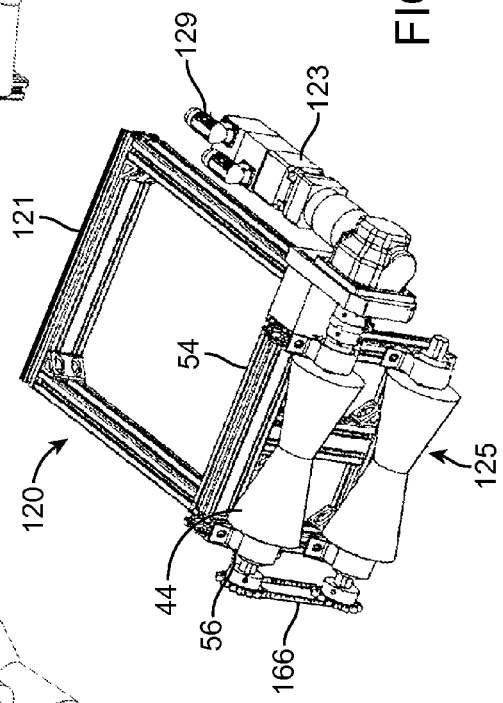
FIG. 7A
FIG. 7B
FIG. 7C

MULTI-AXIS CONTROLLED SELF-CLIMBING TREE TRIMMER

CROSS-REFERENCES TO RELATED APPLICATIONS

The present application is generally related to the following application: U.S. Pat. No. 6,474,377 entitled "Self-Propelled Climbing Tree Trimmer" filed on Feb. 8, 2002 and issued on Nov. 5, 2002, the disclosure of which is incorporated herein by reference in its entirety.

BACKGROUND

1. Technical Field

The invention generally pertains to tree trimmers, and more specifically to an apparatus that is self-propelled and climbs trees in a multi-axis controlled manner for trimming husk, bark, fronds and/or branches with speed and depth managed revolving trimmers.

2. Background

The prior art is replete with various apparatuses and trimmers that allow a user to remove tree branches from a tree trunk without having to climb the tree. Removing tree branches is particularly difficult when palm trees are concerned as the fronds have sharp needle-like barbs on their ends that are connected to husks.

The method typically utilized for trimming and/or dressing palm trees is to manually cutoff and remove the frond adjacent to the palm husk. This operation requires a mechanical hoist or some other method of lifting a trimmer to the area that is to be trimmed. In some cases, the trimming is performed manually by actually climbing the tree using climbing gear that is well known in the art. Regardless of how the tree trimming is accomplished, the increased risk and potential liability associated with such methods increases costs considerably. Additionally, the work is labor intensive and the initial cost of elaborate lifting equipment add further expense.

Over the years various devices have been developed to allow remote tree trimming. For example, U.S. Pat. No. 7,997,311 B2 issued to Prout, Jr. describes a self-propelled climbing apparatus having a climbing section with a main frame incorporating climbing mechanisms attached thereto that include upper and lower wheels that use springs to pull the climbing mechanisms into the trunk to maintain engagement. U.S. Pat. No. 7,422,041 to Smith et al. describes a tree trimming device that automatically climbs a tree and shears limbs or debris as it climbs, the device having an anchor structure with horizontal clamps, a cutting assembly with horizontal clamps, vertical connecting pistons and a cutting blade assembly. U.S. Pat. No. 6,672,346 B1 to Heckmaier describes a palm tree trimming machine having a resilient frame, upright assemblies, drive assemblies, resilient alignment bar assemblies, spring tensioner assemblies, a buss assembly and saw assemblies. U.S. Pat. No. 5,983,966 to Clouston describes a self-propelled tree pruning apparatus having a cutting tool with helical edges, driven wheels and hugger wheels that are rotatably attached to the frame and uses pneumatic air bags to urge the hugger wheels toward the driven wheels such that releasing pressure causes the device to descend to the ground. U.S. Pat. No. 5,975,168 to Ericksson describes a trimming device that utilizes a harvester head positioned at a pre-selected transverse position relative to a tree trunk and an actuator that urges a portion of the device into engagement with the tree and trimming member at a pre-selected transverse position. U.S. Pat. No. 5,524,585 to Barnhill et al. describes a debarking/declimbing apparatus having a rotatably driven spool device that removes the bark as the tree parts are moved lengthwise across its axis. U.S. Pat. No. 4,690,184 to Fuminao describes a tree pruning machine having a cutting unit mounted on a frame and wheels elevating vertically. U.S. Pat. No. 4,527,603 to Hori describes an automatic lopping machine which has a body with a drive unit, a chain saw and a number of drive wheels that revolve helically around the tree trunk to ascend the tree trunk. U.S. Patent Application Publication 2007/0181217 to Adhoot describes a tree trimming apparatus that uses wheel assemblies that are angularly positionable into contact with the tree trunk to support and move the apparatus while cutting with a trolley mounted saw.

Such conventional tree trimming devices present a variety of problems and difficulties, including uneven cutting, and lack of stability and control in climbing and trimming when using remotely controlled tree trimming devices. The invention provides for an improved tree trimming apparatus that addresses the above noted problems and difficulties, as well as provides additional features and functionality not found in conventional devices.

BRIEF SUMMARY

Many attempts have been made in the past to trim trees remotely. This utility is particularly useful when removing fronds or cycads from palm trees since the fronds have sharp needle-like barbs on the ends and considerable dust, dirt, trash and even rodents, can be found in the tops of these trees. The most common procedure for trimming and/or dressing palm trees is accomplished by manually cutting-off and removing the fronds growing from the palm trunk. This operation typically requires a mechanical hoist or some method of lifting a trimmer to the tree trimming site. In some instances a person physically climbs the tree using climbing gear, which has been well known in the art and in use for decades. In either case, the work is dangerous and the liability increases the cost. In addition, the work is labor intensive and the initial cost of appropriate lifting and cutting equipment is relatively high.

Therefore, it is an object of the invention is to provide a mechanical self-propelled trimmer that climbs a tree using a climbing portion and trims the fronds using a trimming portion, thereby allowing an operator to stand a safe distance away and remotely guide the trimmer's climbing speed and depth of cut.

In the past, attempts have been made to develop a self-climbing apparatus, however damage to the tree may occur as tree piercings used to obtain the necessary traction to climb may cause pierce through the outer protective surface layer of the trunk. Piercing the tree's surface permits a host of diseases and fungus attacks to occur which can permanently damage the tree and potentially kill the tree. It is an objective of the invention to be able to control climbing of the tree by a trimming apparatus without causing damage to the tree trunk. In this regard, many embodiments of the claimed self-climbing apparatus use a number of resilient rollers that are shaped appropriately to allow the rollers to grip the periphery of the tree with a reduced clamping pressure. In one aspect, climbing of the tree with the apparatus may be controlled by utilizing a series of carriages distributed about the tree trunk, each carriage having one or more rollers, typically a series of two or three rollers to engage an outer surface of the tree while following the diameter and contour of the tree trunk during climbing. In some embodiments, the roller frame having the rollers disposed thereon may be pivotally coupled to allow slight pivot movement of the roller frame along a substantially horizontal axis (substantially perpendicular to the longitudinal axis of the central passageway) so as to allow the rollers to conform to an uneven surface of the tree trunk during climbing. The rollers are pressed against the surface of the tree trunk from different directions to support the apparatus on the tree trunk during climbing and trimming. The rollers are pressed against the tree trunk by axially extending the rollers inwardly towards the tree trunk, the force on the roller typically being applied by an actuator, such as a screw-type device or a fluid powered tightening cylinder (e.g. a hydraulic or pneumatic cylinder) used in conjunction with a pressure regulator. In such embodiments, the pressure may be controlled and monitored so that pressure information is used as feedback within a multi-axis controller, thereby allowing the pressure applied to the tree trunk to be monitored and adjusted to inhibit damage to the tree.

In another aspect, the tree trimmer system allows the user to control one or more of various functions of a tree trimmer device, including climbing, leveling and trimming. The apparatus may be controlled by a portable hand-held user input control, such as a multi-function joystick that may further include a touch screen that allows a user to interface with a multi-axis controller to permit manual as well as automatic operation of the tree trimming device. In some embodiments, the controller may be configured to allow user operated control of movement along one or more axes and automatic control of one or more axes. For example, in some embodiments, the controller may be configured to allow a user to control movement along a vertical, longitudinal axis extending the length of the tree trunk during climbing, while the controller automatically adjusts one or more variables associated with one or more axes (e.g. vertical or horizontal) to ensure the device remains level and/or centered on the tree trunk during climbing and/or trimming.

In many embodiments, trimming the tree is accomplished by a trimming portion attached to the device. The trimming portion may include any or all of a number of trimming blade members attached to a split ring gear, various cutting tools disposed on a movable member to engage the cutting tool with the tree, the various cutting tools including any or all of a chainsaw, a circular saw or sanding tool, a reciprocating cutting blade, or the like. In an embodiment having a ring gear, the cutting tools may be centrifugally managed or otherwise engageable with the tree trunk or branches, typically by rotating the split ring gear to engage the trimming blade members against the tree branches or fronds to be cut. The cutting tools may comprise a plurality of blade holding members having removable blades with the ability to slice, cut, carve, abrade, sand, peel, rasp and/or finish so as to allow a user to trim and/or obtain an aesthetic finish to the tree trunk. The blade holding members may extend upwards from the ring gear to contact peripheral growth or thatch or may be pivotally coupled with the ring gear so as to pivot and extend inwards toward the tree trunk when the ring gear is driven. In other embodiments, the trimming portion may include (in place or in addition to any of the trimming blade mechanisms described herein) an arm coupled to the rigid frame that is moveable toward the tree trunk or peripheral growth, the arm having a circular saw, chainsaw or other such cutting mechanism disposed thereon when the arm is moved toward the tree trunk or peripheral growth by use of an actuator, such as hydraulic or pneumatic cylinder, coupled with the rigid frame. Using a multi-axis controller allows the operator to not only produce a highly repeatable consistent trimming and/or finishing of the tree, but further allows a user to select a manual design pattern on the tree trunk and produce repeatable automatic trim patterns, logos or design from an almost unlimited number of pre-programmed designs.

An important object of the invention is increased safety for the operator when trimming a tree since a user may operate the tree trimming apparatus while removed from the area where the fronds fall. The operator can easily avoid being precariously positioned during any phase of the trimming operation using the trimming system described herein. Another object of the invention is the increased control and automation allowed by the device during climbing and trimming. In one aspect, the automation employs servo motors that provide feedback to its speed and position as well as actuation governed with actuation sensors having similar functions (e.g. fluid powered cylinders governed with pressure and position regulators). Still another object of the invention is the improved speed at which a tree can be trimmed as compared to conventional methods, such as the manual process. The operator can simply attach the tree trimmer around the base of a tree, such as with a cart having a hydraulic power lift, an electric generator and a cable/hose reel, and then stand clear while controlling the movement of the trimmer and depth of cut from a safe remote location. It is easily understood that the time required to trim a tree is reduced to a fraction of the manual trimming process and the cost of the trimmer and a cart is less than those associated with trimming using a hydraulic, cherry picker, boon lift, bucket truck etc., as well as avoiding the labor intensive manual cutting in common use today.

Yet another object of the invention is the flexibility of the trimmer as to what types of trees it can be used to trim. Although it is typically described herein as used with palm trees or cycad's, it may also be used on trees having small branches where it is customary to trim the tree while the tree is still growing.

A further object of the invention is the ability of the trimmer to leave a palm tree with a uniform appearance, as the uneven husks typically left on the tree after trimming according to conventional methods are substantially eliminated. Using the trimming system of the invention, adjacent trees in a row of trees can be trimmed to have the same uniform outward appearance, since the trimmer device is able to provide a more uniform visual outside shape of the tree trunk or even an attractive surface design.

These and other objects and advantages of the invention will become apparent from the subsequent detailed description of the preferred embodiment and the appended claims taken in conjunction with the accompanying drawings.

BRIEF DESCRIPTION OF THE DRAWINGS

FIGS. 6A-6E illustrates various trimming or finishing tools for use with a trimming portion of a tree trimming device in accordance with many embodiments.

FIGS. 7A-7C, illustrate isometric views of a climbing carriage of a climbing portion of a tree trimming device in accordance with many embodiments.

DETAILED DESCRIPTION OF THE INVENTION

Figure 1:
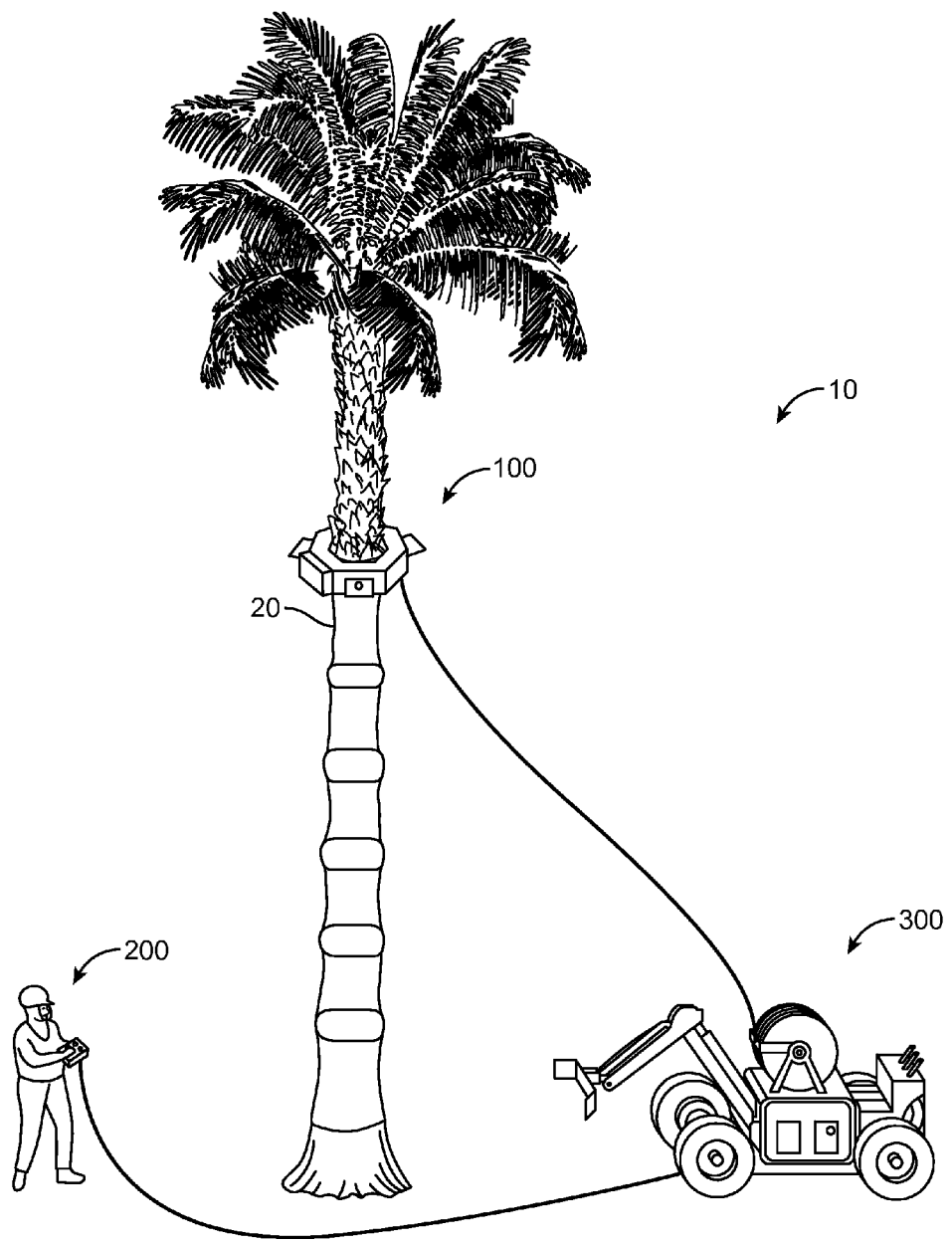
FIG. 1 is a system overview as shown during trimming of a tree with a tree trimming device in accordance with many embodiments of the invention.

The invention generally provides improved methods, systems and apparatus for trimming trees. The invention is particularly advantageous for use in remotely controlled trimming of palm trees that allows trimming of the lower fronds of palm trees while the operator remains on the ground safely removed from the immediate vicinity of the tree in which the trimmed fronds fall. By providing systems with multi-axis control and improved stability and climbing capabilities, the motion of the tree trimming device and various aspect of tree trimming can be better controlled resulting in improved, more consistent tree trimming. Additionally, since the described systems can be automated, at least in part, and can be initiated or controlled remotely, trimming can be performed more safely, quickly and cost effectively when compared to conventional systems and methods.

Although embodiments of a multi-axis controlled self-climbing tree trimming system are shown and described in the accompany figures, it is appreciated that many of the aspects described herein could be used within various tree trimming devices to provide for improved tree trimming within the scope of the invention. The embodiments shown in FIG. 1 through FIG. 13B are described in relation to severing fronds or branches from a growing palm tree, although the invention is not so limited.

The invention generally pertains to an improved tree trimming system that allows for trimming of a tree, such as a palm tree, while a user remains at a location a safe distance from the base of the tree trunk around which debris may fall or accumulate during trimming. In many embodiments, the invention further allows for improved control and consistency in trimming or finishing of the tree trunk, when as compared to conventional methods. A tree trimming system in accordance with many embodiments allows a palm tree to be trimmed according to a variety of differing shapes, patterns, or styles of trimming and/or finishing. Additionally, the improved control and consistency further allows for a desired design or pattern to be realized along a row or series of tree trunks, such as a consistent trimmed appearance along a row of trees or a design that varies with each consecutive tree so that, in combination, the row of trees formed a design.

In one aspect, a tree trimming system includes a self-climbing tree trimming device mountable on a tree trunk, a cart for transporting and mounting the tree trimming device to the tree trunk, and a user input control that allows a user to initiate and/or control various aspects of the tree trimming and finishing process. An example tree trimming device includes climbing portion and a trimming portion attached to a structural frame, the frame having an open configuration for mounting on the tree and a closed configuration for climbing and trimming of the tree. In many embodiments, the climbing portion includes multiple climbing carriages extending inwardly towards the tree trunk when the device is mounted thereon, the climbing carriages each including driven wheels or rollers. The trimming portion includes one or more trimming tools for trimming, shaping or finishing the tree trunk or associated peripheral growth extending from the tree trunk. The trimming tools are attached to the structural frame and are movable toward the tree. The trimming tools may include a variety of rotationally driven cutting mechanisms, including blades disposed on a rotationally driven ring gear, reciprocating saws, routers, circular saw blades, chain saws or any other such tools suitable for use in a trimming/finishing process. In many embodiments, the trimming tool is a rotationally driven assembly having a plurality of trimming tools distributed on a ring gear, although in some embodiments the trimming portion may utilize an upwardly extending arm coupled with the rigid frame that is angularly positionable or extendable relative to the frame, the arm having a circular saw, router, or chainsaw disposed thereon so as to contact the tree trunk or peripheral growth of the tree by moving the arm toward the tree or peripheral growth.

In another aspect, each of the climbing and trimming portions may be controlled according to an automated sequence or program, in response to various sensors of the device, and/or in response to user input on a remote control, according to pre-programmed instructions or any combination thereof. Typically, trimming and finishing a tree with a system in accordance with many embodiments uses a combination of each of these factors in a particular sequence. The system may utilize a multi-axis control system to allow the rigid structural frame of the tree trimming device to maintain a variety of differing positions or elevations during trimming. For example, a system may utilize at least three inwardly extending climbing carriages having driving rollers, each climbing carriage having driven rollers that may be driven independently from rollers on the remaining carriages to allow the rigid frame to maintain a level position, or an angled position, if desired, by driving the rollers of each carriage independently from one another in response to sensor measurement or according to a particular sequence to effect a desired outcome.

FIG. 1 illustrates trimming of a trunk 20 of a palm tree using a tree trimming system in accordance with many embodiments. A palm tree is particularly suited for trimming with the example system, as the peripheral growth is fairly uniform in its growth habits, as well as the shape and size of the outwardly extending palm fronds. Typically, the upper region of the tree trunk of palm tree is covered with a layer of thatch. Thatch is a layer of intermingled dead and/or living stems of the palm fronds. As a palm grows and the lower palm fronds are cut, the living stem eventually dies and often eventually falls off, although often dead stems remain for many years such that the upper portion of the trunk is covered with thatch. Depending on the growth habit and past pruning practices, a heavily thatched layer can be unsightly and aesthetically displeasing in appearance. Additionally, the shape and position of the thatch often causes debris to accumulate in the thatch, which can lead to growth of weeds, bacteria and disease that can negatively impact the appearance as well as the health of the tree.

As can be seen in FIG. 1, the upper region of a palm tree below the palm fronds is heavily thatched such that the outer surface is uneven and jagged, which presents considerable difficulties for conventional self-climbing tree devices. The highly, uneven outer surface of the thatch causes many such devices to climb in haphazard manner, such that at a given stop position, the device is not level, or worse, causing the device to be unstable and slip during trimming. While conventional self-climbing devices may still allow some devices to climb and/or trim a tree, these difficulties limit the precision and control with which a tree can be trimmed. Furthermore, when the stability and position of the self-climbing device is lacking, as in many conventional devices, trimming of a series of trees in a consistent manner, or trimming with intricate designs, or sequential designs is largely unmanageable, if not unfeasible. A tree trimming system, such as described herein, having multi-axis control and more secure climbing abilities provides for a more stable platform from which the tree trimming portion can perform trimming/finishing procedures in a precise, controlled manner. The increased capabilities of these systems allow for not only cutting and slicing of branches, such as palm fronds, in the upper regions of the tree, but also allows for improved consistency in various finishing techniques, such as abrading, sanding or removal of thatch, and trimming of intricate patterns, logos and sequential patterns in adjacent trees in a row of trees.

FIG. 1 shows an example tree trimming system during a trimming/finishing procedure. The tree trimming system including a tree trimming device 100, a hand held control 200 that allows a user to control the device remotely and a cart 300 that may optionally be used to transport and mount the device 100 on a tree trunk 20 using a movable arm, and may be used to power the device with electricity and/or pressurization of a fluid such as a hydraulic fluid or air. Once mounted, the user may use the controller 200 to initiate climbing of the tree trunk 20 with the device and, once a desired position is reached, to initiate and control trimming and finishing of the tree. Trimming generally includes slicing or cutting of branches, palm fronds, stems, and the like, while finishing generally refers to abrading, sanding, peeling, and marking of the tree trunk with a design, pattern or logo.

Figure 2A:
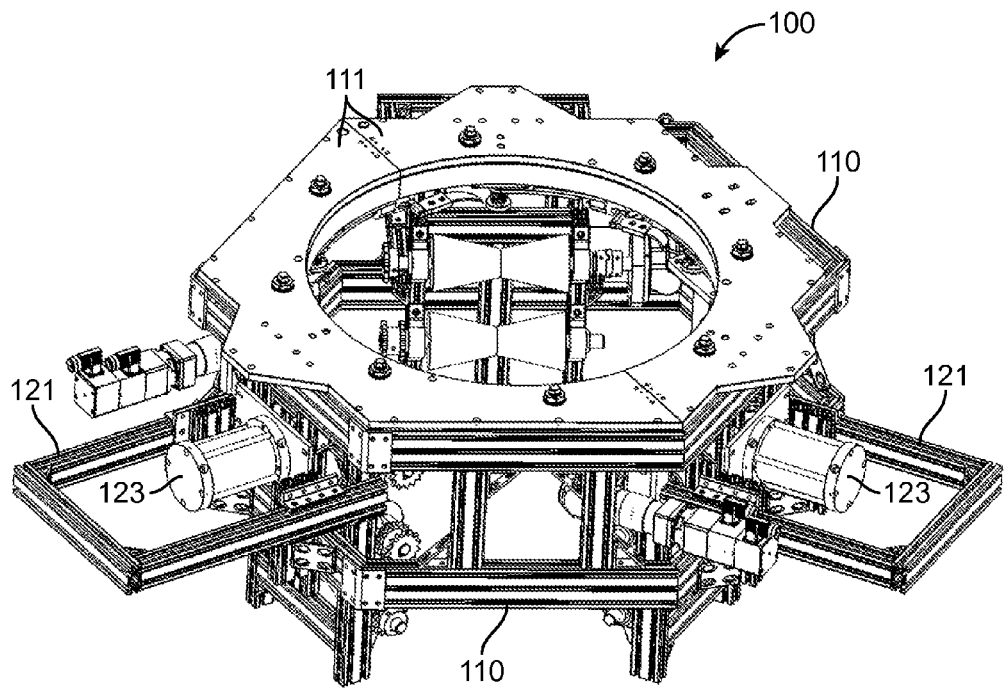
FIGS. 2A-2B illustrate isometric views of a tree trimming device in a closed configuration and an open configuration, respectively, in accordance with many embodiments.
Figure 2B:
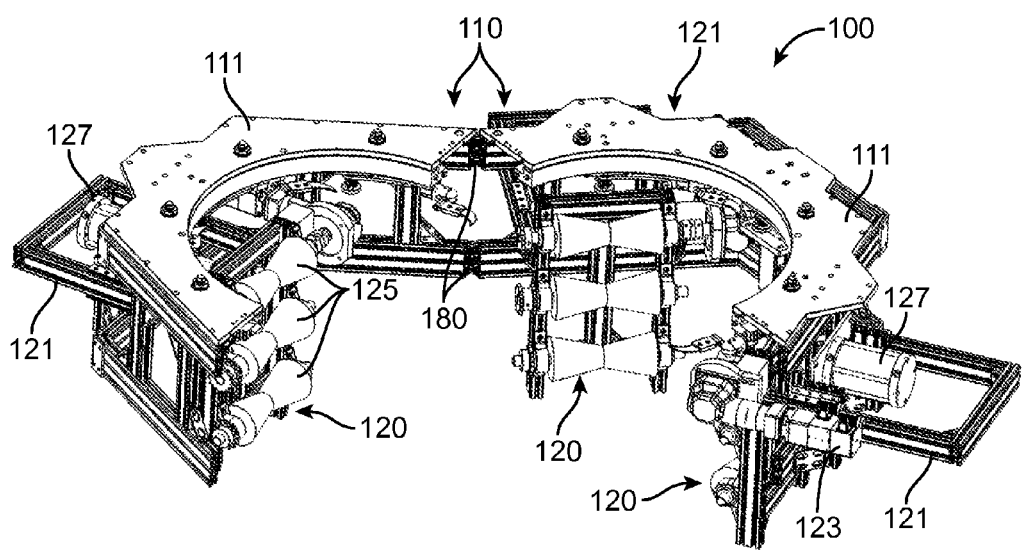

FIGS. 2A-2B shows an example tree trimming device 10 in accordance with many embodiments. The self-climbing tree trimmer 100 includes a structural or support frame 110 configured to encircle a tree trunk and sufficiently rigid to provide structural support for the various other components of the apparatus for climbing and trimming the tree. The structural segment 110 incorporates multiple movable components that enable the structural segment to move between an open configuration to facilitate positioning of the device 100 around the tree trunk 20 and a closed position to facilitate climbing and trimming of the tree by supporting the climbing and trimming portion components of the tree. An example of the rigid frame shown separately from other components is illustrate in FIG. 10B. In some embodiments, the rigid frame 110 includes two moveable halves connected by one or more leaf hinges 180 that allow the halves to move between the open configuration and the closed configuration, the halves being locked together when disposed in the closed position. The structural frame 110 may be constructed from a framework of elongate members, such as a bottom frame 113 and a top frame 115 each made from horizontally extending members joined together by vertically extending members 114, such as shown in FIG. 10B. In some embodiments, the rigid frame 100 is a generally hexagonal shape, although various shapes, such as a circular, octagonal shape may be used, such that the frame defines a central passageway through which the tree trunk extends during trimming (the central passageway having a longitudinal axis that may be aligned with the length of the tree during trimming).

The main frame 110 is typically constructed from extruded structural aluminum forms assembled using various attaching joints at the corners, attaching plates and brackets to create a suitable structure for supporting the climbing and trimming portions described herein. The basic structural aluminum members are produced by a number of manufacturers and can be easily assembled by mitering the ends and attaching together with off-the-shelf components using similar aluminum extrusions with threaded fasteners and tapped closures that slide into encapsulating grooves that are shaped into the basic aluminum forms. Any type of mechanical structure or materials, suitable for supporting the climbing portion 120 and trimming portion 130 may be used. As can be seen in FIGS. 2A-3B, the top surface of the main frame may be attached to a split-top plate 110, and may utilize a similar leaf hinge 180 to allow the split-top plate to move between the open configuration and the closed configuration and a latch and keeper mechanism 182 to lock the split-top plate into the closed position. The split-top plate may be used to support the trimming portion 130 of the device 100.

The climbing portion 120 attached to the frame 110 allows the device to climb and descend the tree trunk to facilitate trimming with the device. In some embodiments, the climbing portion 120 includes multiple climbing carriages 121 attached to the main frame 110 at various locations that extend inwardly toward a tree trunk 20 when the device is mounted thereon. The climbing portion 120 often includes at least three climbing carriages 121 disposed around the central passageway. The carriages generally include one or more rollers positioned so that inwardly extending the carriages engages a surface of the trunk with the one or more rollers on each carriage. The carriages 121 may be extended inwardly using actuators 123, such as a hydraulic or pneumatic cylinder or any suitable actuator, to move the carriage inward with sufficient force so that, in combination, the inwardly extended rollers of each carriage support the weight of the device 100 for climbing and trimming with the device.

In some embodiments, the carriages each include a roller frame having at least two rollers distributed along a vertical axis substantially parallel with the longitudinal axis of the tree trunk, although the roller frame may include three or more rollers. The roller frame is attached to the climbing carriage, and substantially perpendicular, so that the climbing carriage extends inward along an axis toward the tree trunk, while the roller frame extends generally parallel with the longitudinal axis of the tree trunk. The climbing carriages are inwardly extended using actuators 123, such as hydraulic or pneumatic cylinders. Various aspects of the climbing carriages can be understood further by referring to FIGS. 7A-7C and 9A-9B.

Once the tree trimming device is positioned at a desired location on the tree trunk, such as adjacent to a thatched portion, branch or palm frond, the trimming portion 130 can be controlled by the user to perform a trimming or finishing procedure. For example, the position of the device 100 may be maintained by the climbing portion 120, while the trimming portion 130 is used to cut the base of one or more palm frond stems disposed within or adjacent the central passageway of the device 100. In some embodiments, the trimming portion 130 engages the tree trunk, thatch, and/or the peripheral growth of the tree while the climbing portion 120 changes the position of the device 100 on the tree trunk 20, such as changing an elevation or angle at which the device 100 is mounted to the tree trunk 20.

Although the trimming portion 130 may include a variety of trimming tools and associated mechanisms, such as any of those described herein, that may be interchangeably attached to the device 100 or selectively actuated by a user to perform a desired trimming or finishing procedure. In some embodiments, such as that shown in FIGS. 2A-5C, the trimming portion 130 includes a ring gear 131 movably attached to an underside of the split top-plate 111. The ring gear 131 is rotationally driven and includes multiple trimming tools having blades so that when the ring gear is rotated, the blades extend inwardly toward the tree trunk (e.g. the trimming tools are configured so that the rotational force of the ring gear causes pivotal movement of the trimming tool forcing the blade inward toward the tree trunk). These aspects can be understood further by referencing FIG. 3B and FIGS. 4A-5C.

Figure 3A:
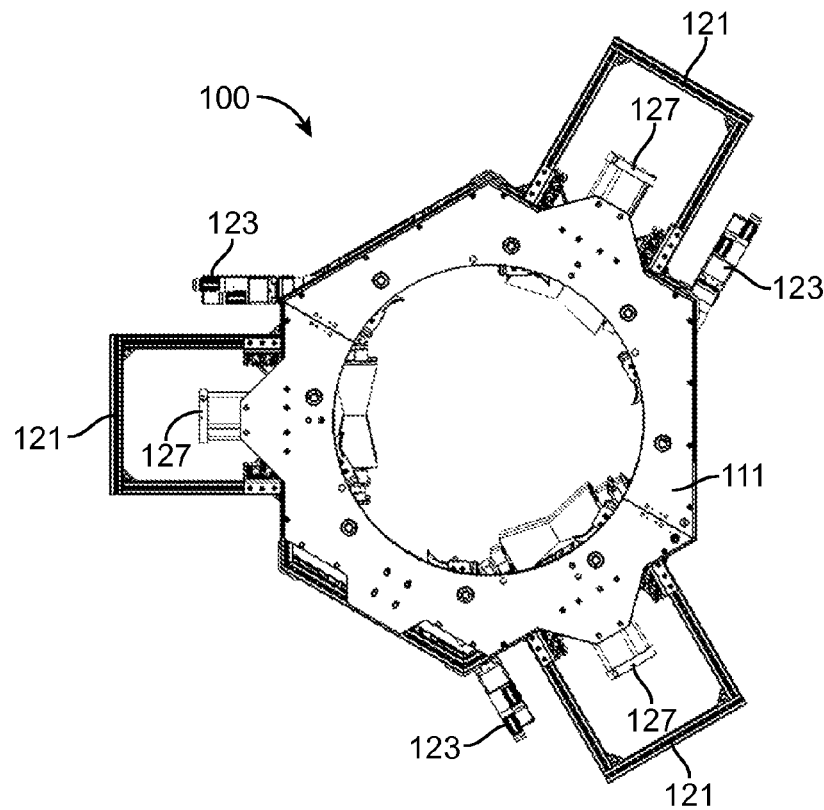
FIGS. 3A-3B illustrate top and bottom views of the tree trimming device in FIGS. 2A-2B.
Figure 3B:
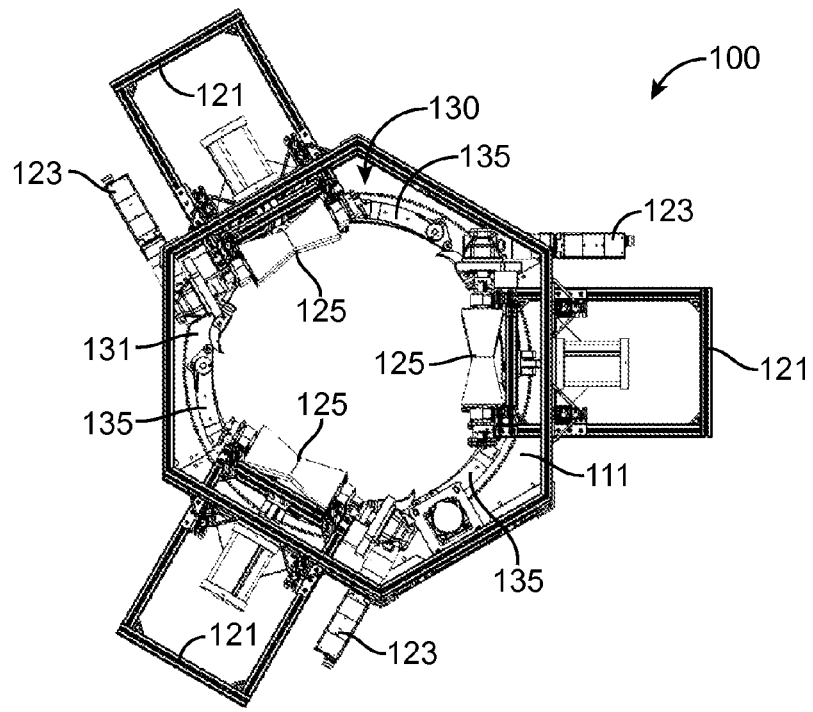
Figure 8A:
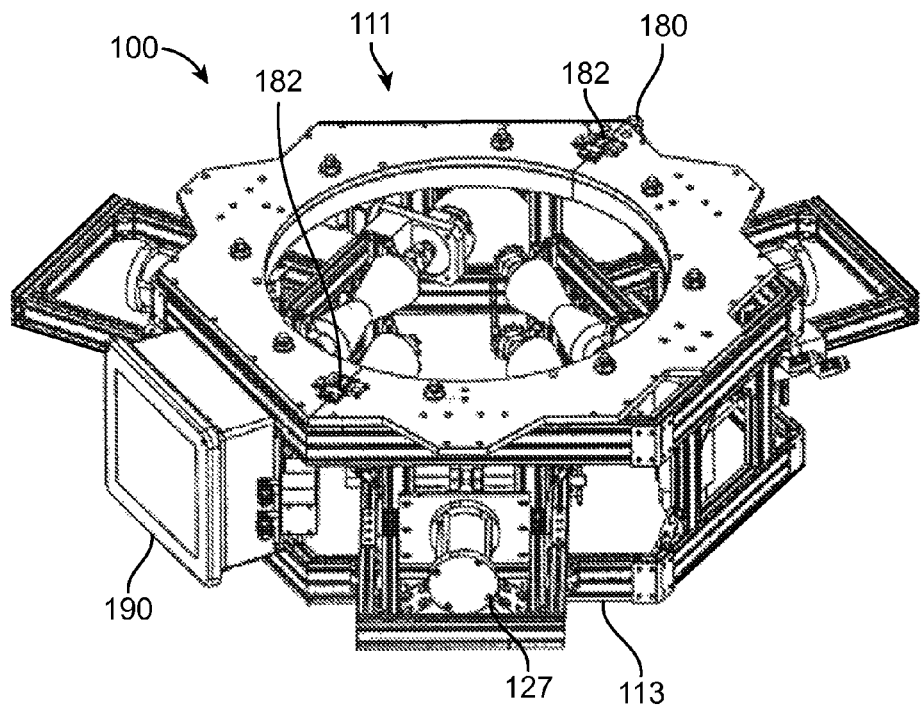
FIGS. 8A-8B illustrate isometric views of an alternative tree trimming device in a closed configuration and an open configuration, respectively, in accordance with many embodiments.
Figure 8B:
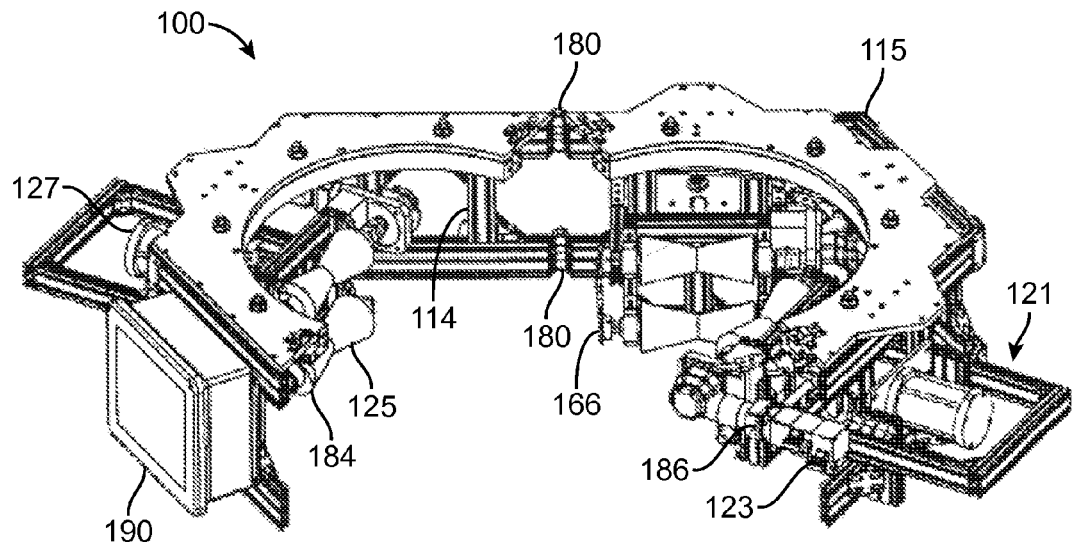
Figure 9A:
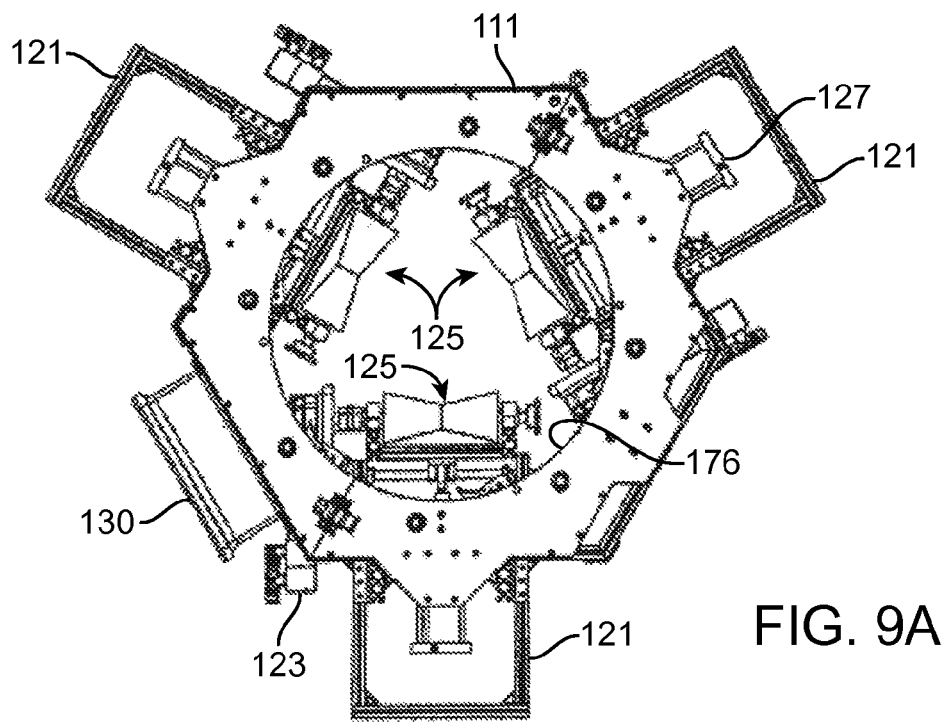
FIGS. 9A-9B illustrate top and bottom views of the tree trimming device in FIGS. 8A-8B.
Figure 9B:
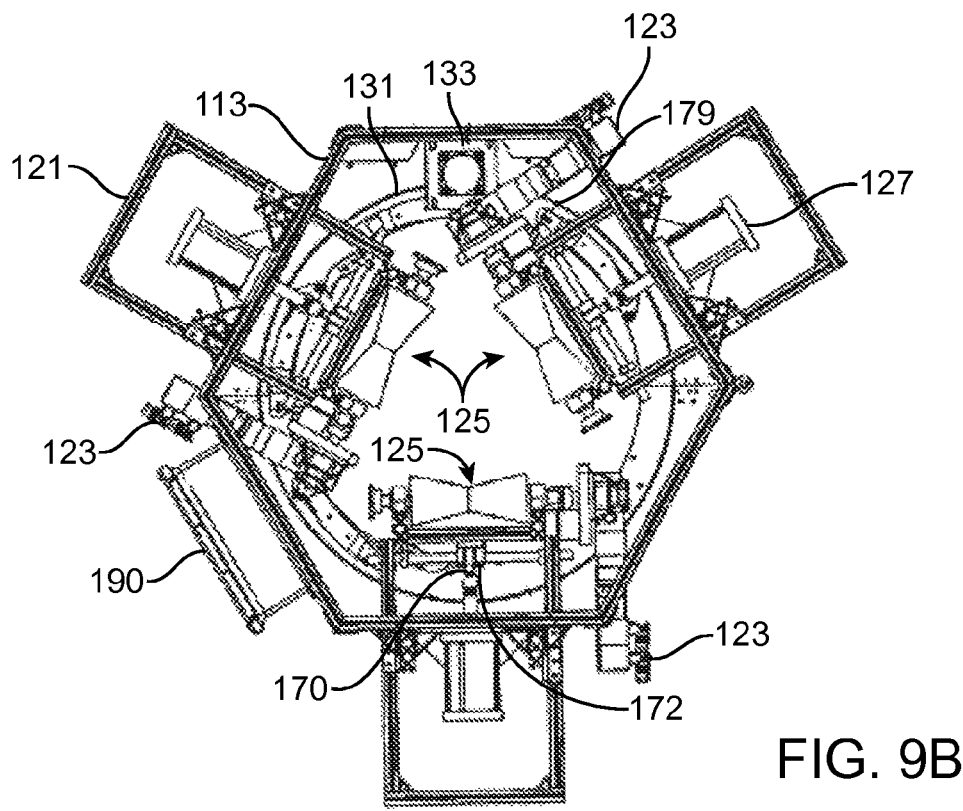

The tree trimmer device 100, in the example embodiment in FIGS. 3 and 5, includes a hinged split top plate 111 attached onto the top surface of the structural frame 100. The split top plate 111 includes a centrally located round hole defining the central passageway and matching the inner diameter of a split ring gear 131, the top plate being essentially hexagonal in shape, as shown in FIGS. 2A-4A, although the top plate may be fabricated in various other shapes for a given structural frame. In many embodiments, the top plate 111 includes a hinged first and second portion that move between an open position for receiving a tree trunk within the central passageway of the device 100 (as shown in FIG. 2B) and a closed position for climbing and trimming a tree (as shown in FIG. 2A). In the depicted embodiment, the hinged split top plate 111 utilizes two separate, but essentially equal, halves made of aluminum having a thickness of at least 0.50 inches (1.27 cm) employing a leaf hinge 180 joining the halves and also a releasable center latch and keeper 182. The split top plate 111 further includes a number of alignment sockets 184 and alternating pins 186, as shown in the embodiment of FIG. 8A-8B, such that when the split portions in the top plate 111 join together a rigid joint is created. These aspects may be incorporated into any of the embodiments described herein. The ring gear 131 has the same alignment sockets 84 and alternating pins 86 for the same function. These aspects may be incorporated into any of the embodiments described herein.

Figure 4A:
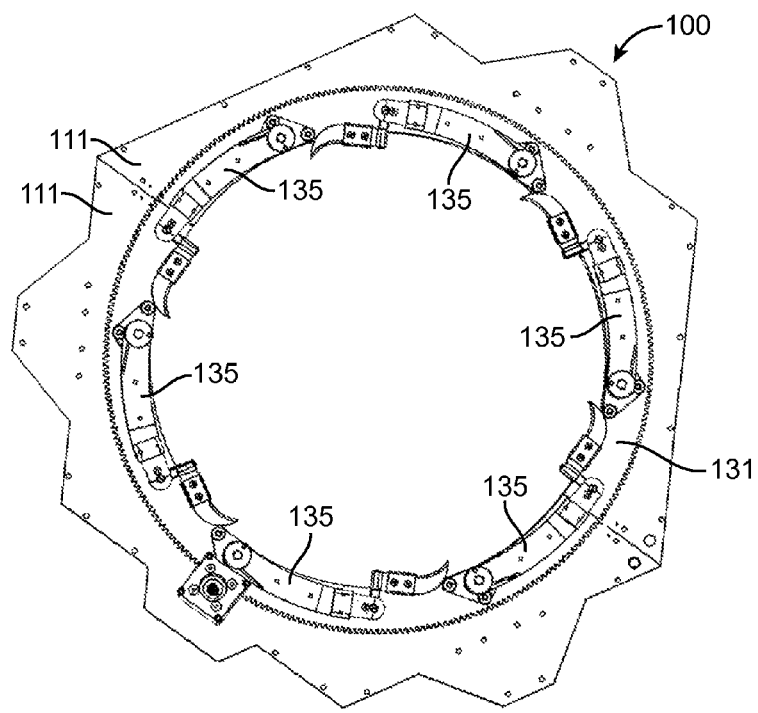
FIGS. 4A-4B illustrate a trimming portion of a tree trimming device in accordance with many embodiments.
Figure 4B:
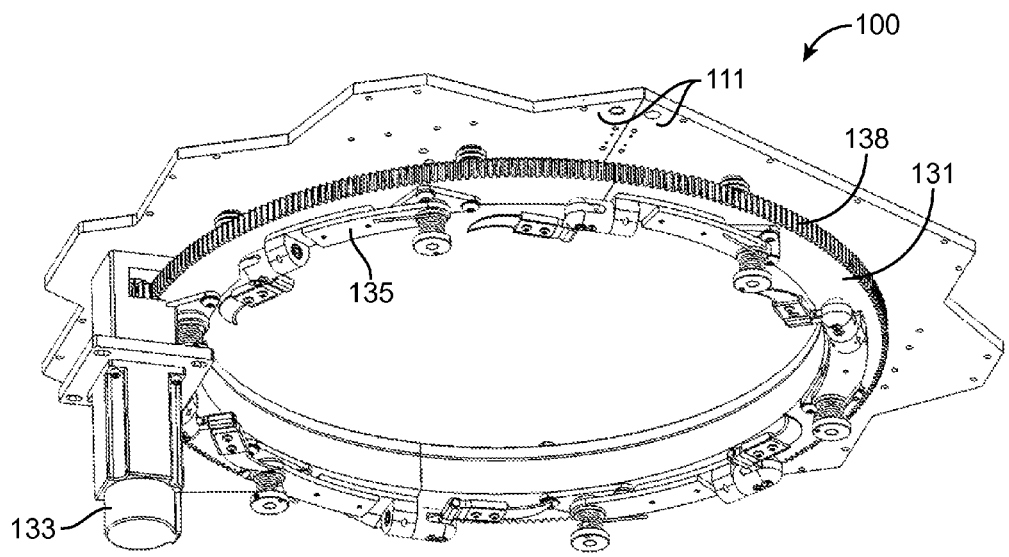

Once the tree trimming device 100 is mounted and positioned at a desired location along the tree trunk, the trimming portion 130 of the tree trimming device allows the user to effect trimming and/or finishing of a tree trunk surface. The tree trimming portion 130 utilizes a plurality of centrifugally managed cutting tools 135 attached to a rotationally driven ring gear 131 disposed about the central passageway of the device 100, such as shown in FIGS. 4A-4B. Rotating the ring gear drives the blades of the tools 135 into engagement with the tree. The external tooth split ring gear 131 is rotatably attached to the underside of the top plate 111 along a series of multiple mounting points and includes outward-extending teeth 138 on an outer peripheral surface of the ring gear 131. In the embodiment shown in FIGS. 5A-5C, the ring gear 131 is configured in an essentially L-shape and includes a recessed groove 137 in a top surface and a horizontal outward-extending V-shaped bearing profile 132. Top plate 111 has a number of dowel pins 117 attached with a portion of the pins extending beneath, slidably interfaced within the ring gear recessed groove 137. The top plate 111 further includes a number of roller bearings 112 attached to the underside of the top plate 111, the roller bearing having eccentric mounts with a V-shaped profile that interface with a corresponding V-shape outer-facing surface 132 of the ring gear 131, although in other embodiments, the roller bearings may be various other shapes. The roller bearings 112 retain the ring gear 131 in juxtaposition under the top plate 111 urging the ring gear 131 inwardly against the dowel pin 117 within the recessed groove 137 in the ring gear 131 so as to allow the ring gear to be rotationally driven while attached to the underside of the top plate 111.

Figure 5A:
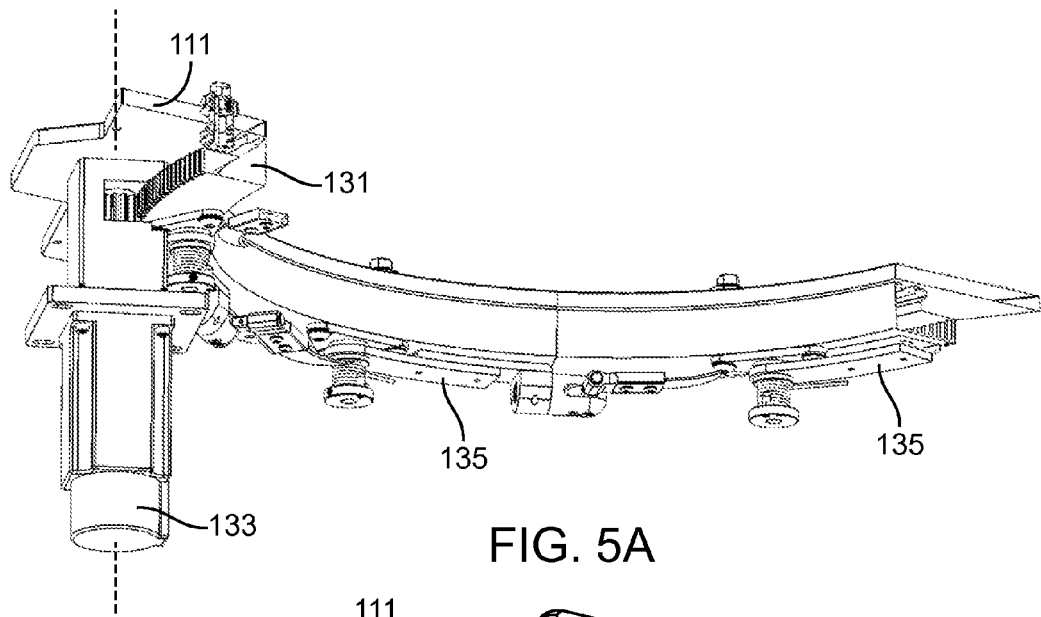
FIGS. 5A-5C illustrate a cross section and detail views of the trimming portion of the tree trimming device depicted in FIGS. 4A-4B.
Figure 5B:
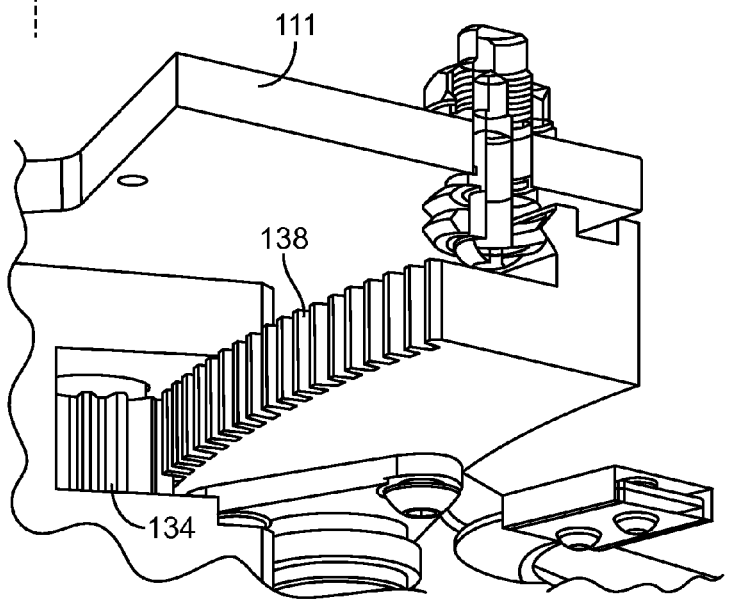
Figure 5C:
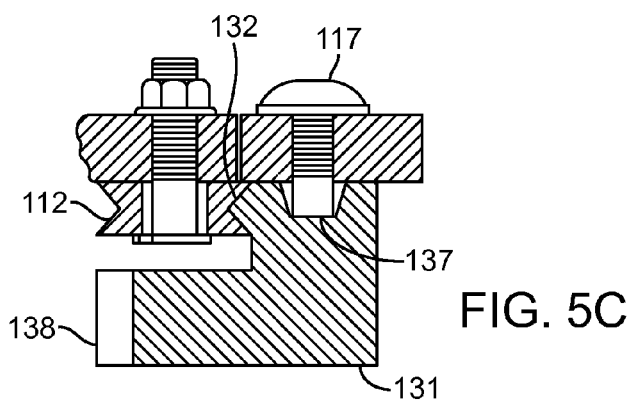

An actuator 133, such as a servo motor, may be used to drive ring gear 131 to effect trimming with the device 111. In one aspect, the servo motor includes a pinion gear driven along a designated axis, the driven gear having teeth 124 that correspond to the outward-extending teeth 138 of the ring gear, as shown in FIGS. 5A-5B, such that driving the servo motor rotationally drives the ring gear 131. The servo motor 131 pinion gear teeth 124 mesh with the ring gear teeth 138, providing sufficient rotation of the ring gear 78 to move cutting tools 125 inward to engage a surface of the tree and/or a branch or palm frond stem. In some embodiments, the cutting tools 135 include multiple centrifugally managed cutting mechanisms, such as those described in further detail below.

FIGS. 4A-4B illustrate an embodiment in which the plurality of cutting tools 135 includes a number of spring-loaded trimming blade members affixed onto the multiple mounting points on an underside surface of the ring gear 131. When rotated, the cutting tools 125 unlatch and pivot, with spring pressure, engaging a blade member 139 of the cutting tool into the trunk of the tree 20 to effect controlled trimming and/or finishing of the tree. Various characteristics of trimming, including shape, surface texture and depth of cut, are determined by multiple factors, including the profile of the cutting tool or blade, the speed at which the ring gear is driven, the duration at which the cutting blades engage the surface, the number of passes of a cutting blade at a particular location, and/or the amount of revolutions per foot rotation of the split ring gear 78 that is produced by the second servo motor 98. In another aspect, once the cutting tools 135 are engaged with the tree, the angle at which the device 100 is mounted on the tree may be change to create an angled or spiral design on the tree trunk 20, or to peel a thatched material as the device 100 descends.

FIGS. 6A-6E shows examples of cutting tools 135 for use with the self-climbing tree trimmer described herein. The device may use any or all of the tools, or combinations thereof. The example of FIG. 6A shows a cutting tool 135 comprising a spring-loaded trimming blade member. The spring-loaded cutting tool 135 extends from a proximal torsion spring 142 adjacent a ring gear mounting bracket 141 to a distal cutting blade 139. Such cutting tools are particularly useful for trimming of the stems of palm fronds as well as trimming or finishing the thatch or surface of the tree trunk. In some embodiments, the distal cutting blade 139 is removable to allow the blade to be replaced with a variety of different removable blades according to a desired trimming or finishing function. Examples of alternate removable blades are shown in FIGS. 11A-11H, each blade configured to perform a different function, such as slicing, cutting, carving, abrading, sanding, peeling, rasping and finishing, respectively. In another aspect, the apparatus could include multiple differing types of blades that could be selectively deployed by a user as needed for differing processes during trimming of the tree.

FIG. 6B shows a cutting tool 125 comprising a trimming or finishing tool 170 mounted on a pivoting arm 172 movable toward the tree by use of an actuator 174 attached to an outwardly protruding bracket 176. The actuator 174 may be any suitable mechanism attached to the pivoting arm 172 that provides controlled movement of the trimming or finishing tool 170 towards the tree. In some embodiments, the actuator is a fluid powered actuator, such as a hydraulic or pneumatic cylinder. The trimming or finishing tool 170 may include a rotating saw blade, as shown in FIG. 6B, or may utilize a rotating sanding wheel, a chain saw, or reciprocating blade.

FIG. 6C shows a cutting tool 135 comprising a plunge router 180, such as a two-axis plunge router movable along two transverse axes, such as a horizontal and vertical axis. The plunge-router may be used to router a design, logo, or letters into the tree trunk, typically using a pre-programmed routing sequence. In some embodiments, the router moves along two tracks corresponding to the two axes to create the design, the horizontal axis may be curved to correspond to the curvature of the tree trunk, and the depth at which the router extends into the tree trunk may be varied to create the appearance of shading or variations in the design.

FIG. 6D shows cutting tools 135 comprising a plurality of upwardly extending blades 185 supported by blade holders attached to the ring gear. As the ring gear is driven, the upwardly extending blades 185 may engage outwardly extending tree branches or thatch so as to cut the branches or trim remove excess thatch. In some embodiments, the blades 185 are removable and interchangeable with a variety of differing blades, each suited for a differing task. FIG. 6E shows a cutting tool 135 comprising a chainsaw 171 mounted on a similar arm as in FIG. 6B.

Figure 10A:
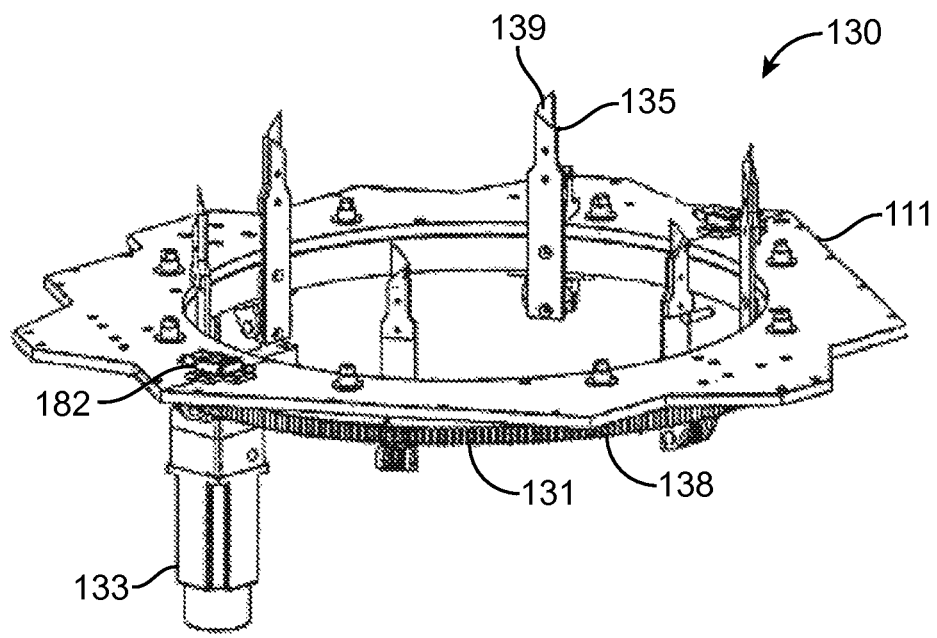
FIGS. 10A-10B illustrate perspective views of a tree trimming portion and a support frame of a tree trimming device, in accordance with many embodiments.
Figure 10B:
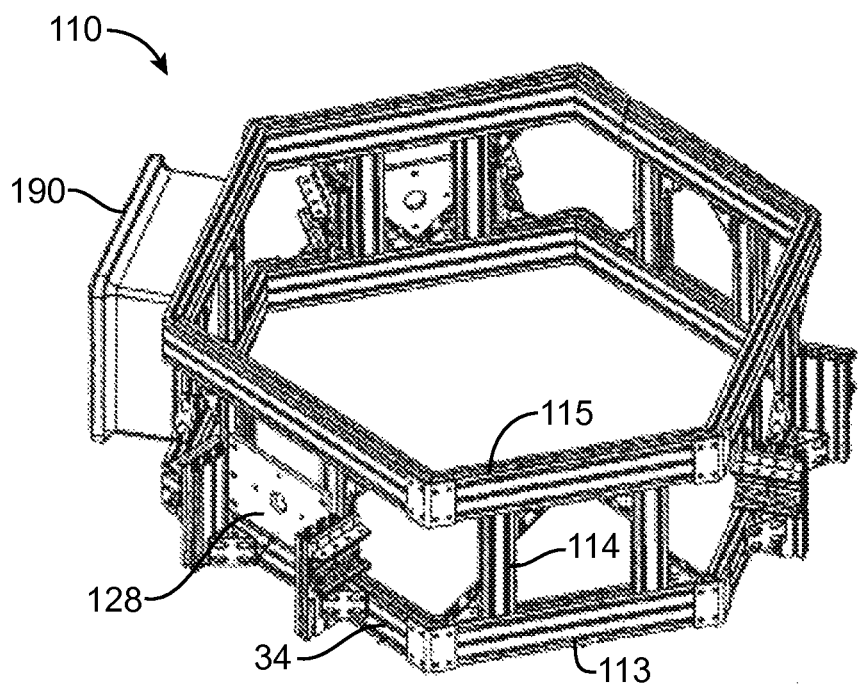
Figure 11A:
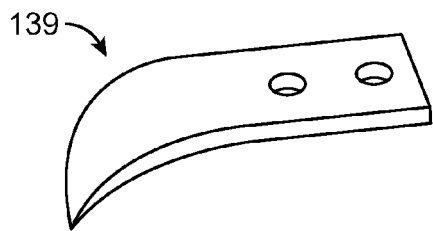
FIG. 11A illustrates a removable trimming tool configured to slice for use with a tree trimming device in accordance with many embodiments.
Figure 11B:
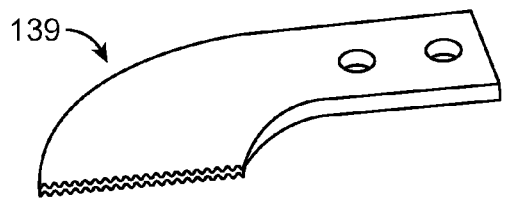
FIG. 11B illustrates a removable trimming tool configured to cut for use with a tree trimming device in accordance with many embodiments.
Figure 11C:
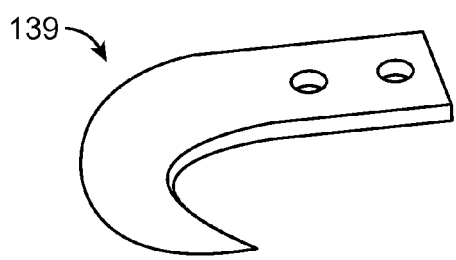
FIG. 11C illustrates a removable trimming tool configured to carve for use with a tree trimming device in accordance with many embodiments.
Figure 11D:
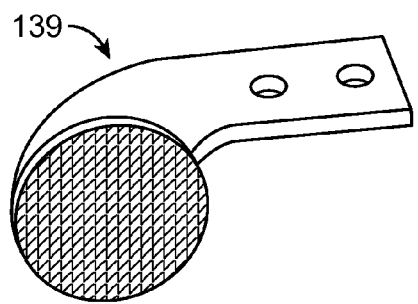
FIG. 11D illustrates a removable trimming tool configured to abrade for use with a tree trimming device in accordance with many embodiments.
Figure 11E:
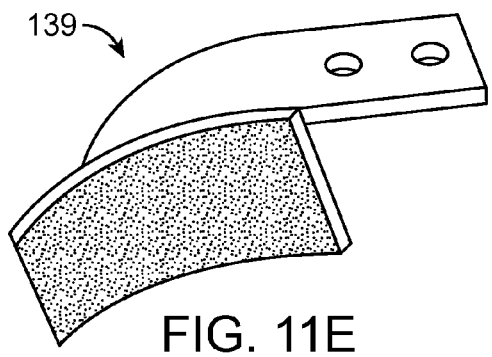
FIG. 11E illustrates a removable trimming tool configured to sand for use with a tree trimming device in accordance with many embodiments.
Figure 11F:
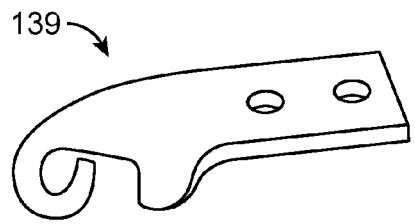
FIG. 11F illustrates a removable trimming tool configured to peel for use with a tree trimming device in accordance with many embodiments.
Figure 11G:
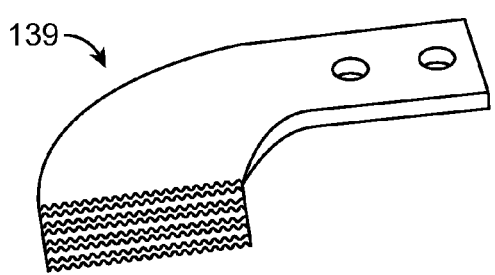
FIG. 11G illustrates a removable trimming tool configured to rasp for use with a tree trimming device in accordance with many embodiments.
Figure 11H:
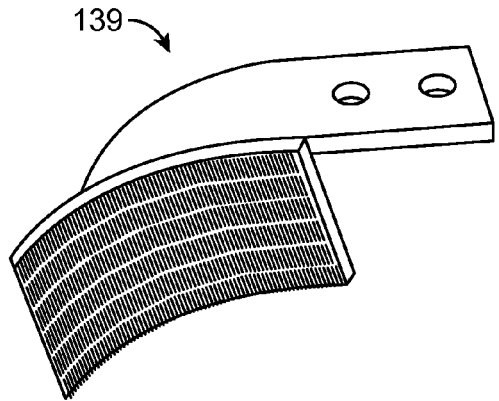
FIG. 11H illustrates a removable trimming tool configured to finish for use with a tree trimming device in accordance with many embodiments.

In one aspect, the cutting tools 135 may be configured to extend vertically upwards, such as shown in FIG. 10A, so that driving the ring gear effects cutting of stems directly above the top plate 111. In other embodiments, the cutting tool may be independent from the ring gear, such as a chain saw, circular saw, reciprocating saw, or other cutting tool attached to the tree trimming device 100. Such cutting tools may be mounted to extend vertically upwards, as described above, or to be angularly positionable, for example attached to a hinged arm, to allow a user to position the cutting tool as desired and may be driven by a separate servo motor or may include an alternatable drive element so as to utilize an existing servo motor, which may be particularly advantageous for cutting of woody stems and larger branches. These various types of cutting tools may be incorporated into the device 100 to be selectively engaged by a user or according to a pre-programmed sequence.

The trimming portion may include any or all of a number of trimming blade members attached to a split ring gear, cutting tools disposed on a positionable arm to engage the cutting tool with the tree, the various cutting tools including any or all of a chainsaw, a circular saw, a reciprocating saw, or the like, or any combination thereof. The trimming portion may include any of the cutting tools described in U.S. Pat. No. 6,474,377, the disclosure of which has been previously incorporated herein by reference for all purposes.

In another aspect, the cutting tools 135 of the trimming portion 130 may also include a tool configured to form a pattern, design, or logo for aesthetics or advertising purposes, such as a two-axis plunge router, a flame cutting, laser cutting or etching, burning tool, or the like. In some embodiments, the decorative pattern or logo forming tool may be used in addition to or in place of any of the cutting tools described herein. For example, the embodiment shown in FIG. 2A may optionally include a removable logo forming tool, such as a two-axis plunge router, configured to create a routed design, such as a logo or lettering within the smoothed outer surface of the tree trunk, while the rigid structural frame 110 of the device 100 remains stationary. Alternatively, the device 100 may include a router that translates along a horizontal axis while the climbing portion introduces vertical movement of the router along the vertical axis so as to form a routed design along two axes.

To position the tree trimming device 100 at a desired location in the tree, the device 100 includes a climbing portion 120 having a plurality of driven rollers that allow the device to climb the tree trunk 20 or to support the device at a variety of positions or angles on the tree. In some embodiments, the climbing portion 120 includes at least two climbing carriages, preferably three or more, each climbing carriages includes at least two driven rollers thereon, the driven rollers of each carriage being distributed or spaced apart along a vertical axis. The outermost rollers of each climbing carriage are spaced apart by a separation distance, typically between 6 inches and 36 inches, preferably between 8 inches and 24 inches, so that each carriage has sufficient leverage to provide improved support and stability of the tree trimming device. It is appreciated that the dimensions of the rollers, as well as the spacing between rollers may be a function of the overall size of the device and diameter of the central passageway, which may correspond to the size of the tree trunk. For example, in some embodiments, the width of the rollers may be configured so that the rollers, in combination, circumscribe from $\frac{1}{10}$ to the entire circumference of the central passageway. In some embodiments, the vertical spacing between the outermost rollers in a climbing carriage is between 0.1 to 5 times the diameter of the tree trunk. The dimensions of the rollers and the associated spacing may vary according to the device, the tree being trimmed, as well as the particular application for which the device is being used. For example, the device could be used to lift a person into the tree to facilitate manual trimming of various types of tree, or could be used to deliver various devices into the tree. Having multiple rollers spaced apart further aids in alignment and traction as the apparatus climbs and descends the tree trunk. The multiple spaced apart rollers also improve stabilization during trimming and/or shaping with the device.

Each of the rollers may be V-shaped so as to conform to the curved outer surface of the tree trunk and facilitate frictional engagement with the tree. In an alternative embodiment, the roller may include a cylindrical roller, a concave roller, or pair of wheels spaced apart on an axel. The rollers may be conformable or rigid. The rollers of each carriage may use an associated servo motor so that each carriage can be independently driven to allow for multi-axis control of the tree trimming device and allow the device to maintain a level position or to provide an angled position as desired.

Figure 14:
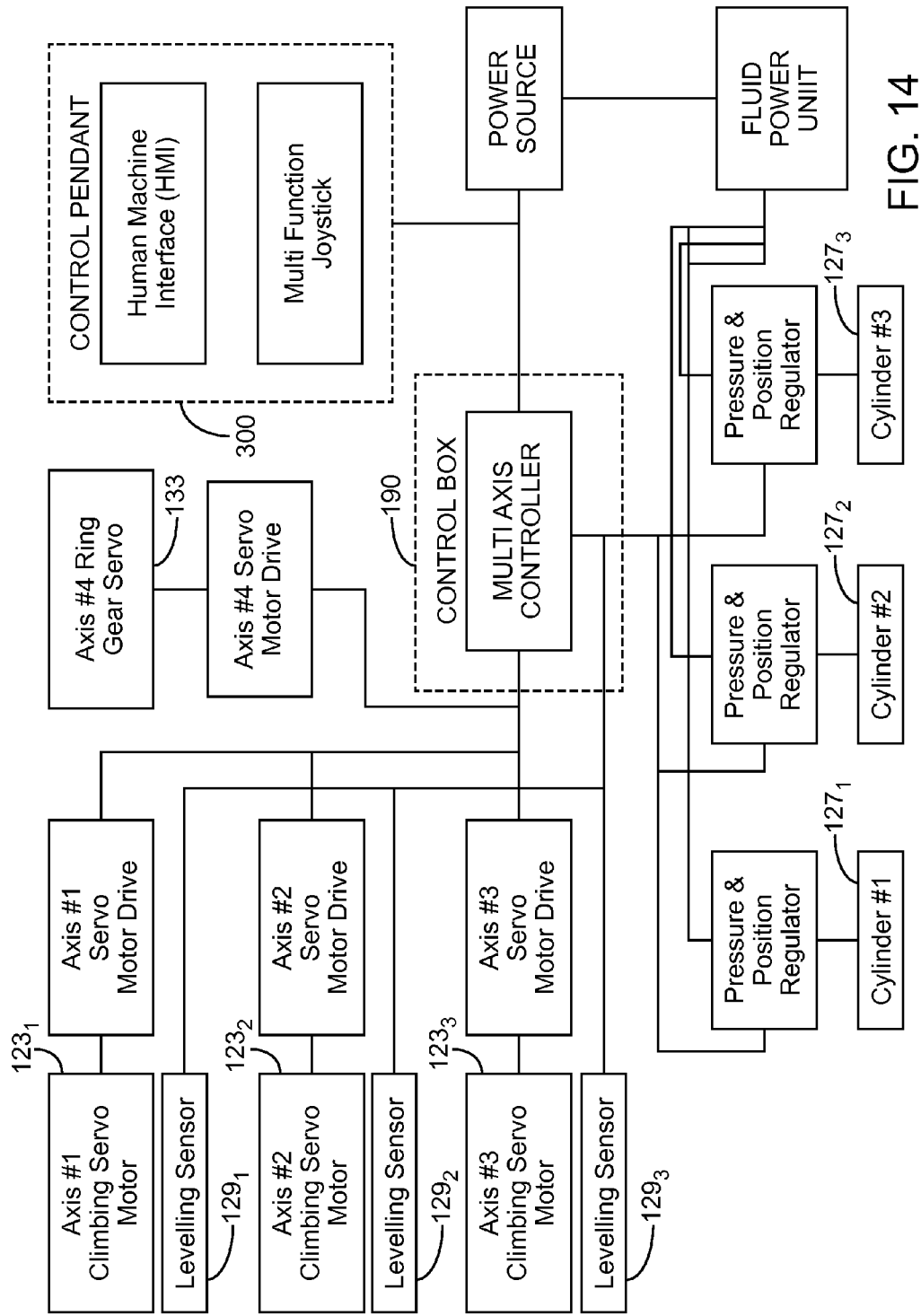
FIG. 14 is a block diagram of the multi-axis system controls incorporating an multi-axis controller interacting with the motor drives, servo motors, pressure and position regulator for each fluid powered cylinder, as well as the power resources and the user input control.

In the embodiment in FIGS. 2A-3B, the climbing portion 120 of the device 100 includes three inwardly extending carriages 121 disposed about the central passageway, each carriage including a roller frame 125 having three V-shaped rollers disposed thereon. Each carriage include a servo motor 123 for driving the rollers, for convenience they are designated axis #1 climbing servo motor $123_1$, axis #2 climbing servo motor $123_2$, and axis #3 climbing servo motor $123_3$. Further, each servo motor 123 utilizes a separate leveling sensor and/or inclinometer and an associated axis servo motor drive, as depicted in FIG. 14.

In the embodiments shown in FIGS. 7A-7C, each climbing carriage 121 includes a rectangular horizontal carriage frame that slides on linear bearing slides 122 that are fixedly attached to the structural frame 110 on each side, the rectangular horizontal carriage frame attached to a vertical roller frame 125 so that when the horizontal carriage frame is extended inwardly by an actuator 127, such as a hydraulic or pneumatic piston, the carriage frame slides along the veering slides 122 and forces the rollers on the vertical roller frame 125 against the surface of the tree trunk 20. The actuator 127 may be a hydraulic or pneumatic cylinder attached to a base plate 128 that is fixedly attached to the structural frame 110 so that movement of the actuator extends a piston through the plate 128 and moves the roller frame 125 on which the one or more rollers 44 are disposed toward the central passageway until the one or more rollers 44 engage the outer surface of the tree trunk. The actuator 127 may be regulated, such as changing a pressure in a fluid powered cylinder, to provide a desired force of the one or more rollers against the tree trunk. The actuator may be powered by a pressurization hose extending from cart 300 that allows the system to increase or decrease the pressure in the fluid powered cylinder as needed to center the device so that the center of the central passageway is substantially aligned with the longitudinal axis of the tree.

In one aspect, the actuator 127 applies the inwardly extending force on the vertical roller frame at a location above a midpoint of the vertical roller frame. Additionally, the horizontal frame 121 may be coupled to the vertical roller frame 125 at a location above a midpoint of the vertical roller frame 125. This aspect allows the inwardly directed force on the roller frame to be applied biased toward an upper half of the roller frame, which assists in providing substantially contiguous engagement of the tree trunk with the rollers, particularly when climbing over an uneven surface such as a thatched surface. This aspect also utilizes the spacing between the rollers so as to use the leverage of the carriage configuration to help support the weight of the device 100 on the tree trunk to maintain stability of the device mounted on the tree trunk. In some embodiments, the piston is pivotally attached to the vertical roller frame to allow for inward extension of the carriages while allowing slight pivotal movement of the carriage as it climbs over the uneven thatched surface.

As can be seen in FIGS. 7A-7C, the distally extending piston that causes axial movement of the rollers of the roller frame 125 toward the tree trunk is coupled to the vertical roller frame above a mid-point of the major vertical dimension of the vertical roller frame. Alternatively, the piston is attached at a location above a mid-point of the dimension between the outermost rollers of the roller frame (e.g. the upper-most roller and the lowest the rollers). This aspect allows the carriage to torque the lower set of rollers with greater force into the tree to create a primary with the lower rollers and a secondary traction force with the upper rollers, respectively. Additionally, when used in a tree trunk having thatch, this configuration is advantageous in that biasing the axially extending member (e.g. the piston) towards the upper portion of the roller frame 125 allows the lower rollers to climb over the severed ends of thatch and not track under. Also, as often tree trunks tend to flare towards the bottom of the tree, this configuration allows for increased traction and stability as it allows the rollers to pivot over uneven or thatched portion with the upper roller(s) providing the main climbing force while the lower roller(s) provide clamping or retention forces but typically with slightly less force than the upper roller(s).

The rollers of the roller frame 125 are configured to engage the tree trunk 20, shown in FIG. 1, and may be fabricated from any material suitable for engaging an outer surface of a tree trunk. In many embodiments, the rollers 44 are formed of thermoset material and are attached to the vertical roller frame 125 with flange mounted bearings. To improve conformance with the outer surface of the tree trunk, the rollers of roller frame 125 may be shaped to have an increased dimension towards the outer ends of the roller, such as a concave surface, a V-shaped, or even a pair of rollers spaced apart on an axel. Typically, the each climbing carriage includes at least two V-shaped rollers, the dimension of the V-shape being suitable to fit a 12-inch to 20-inch diameter tree, although varying shapes and sizes of rollers may be used as needed. In the examples shown in the accompanying figures, the V-shaped rollers each have a flexible coupling on a first shaft end and a gear on a second shaft end, as shown in each of FIGS. 7A-7C. The first shaft end is driven by a first servo motor 123 and the second shaft end (and third shaft in some embodiments) has a roller chain 166 driving an additional V-shaped roller, with each additional tandem roller having only one toothed gear on its second shaft end.

The attachment means that permits linear movement to the rollers frame 125 may use a fluid powered tightening cylinder 68 (e.g. a hydraulic or pneumatic cylinder), as illustrated in FIGS. 7B and 7C which includes a piston rod with a pivotal clevis end 70. The carriage vertical roller frame portion 54 includes an eyebolt 72 which is attached to the clevis end 70, thereby permitting the vertical roller frame portion 54 to revolve freely within its mechanical limits. Since there are preferably three climbing carriages 42, multiple cylinders 68 are utilized which are designated as cylinder 68 #1-3 along with pressure and position regulators 69 designated 69 #1-3.

The tree trimming device 100 includes a control system that provides for a variety of different functions and features, some of which may be performed automatically and others of which may be performed in response to a user input, such as a handheld user control. The tree trimming device may include a control box 190 disposed thereon, such as in FIG. 8B, or the control box may be in communication with the device 100 and be disposed elsewhere. In many embodiments, the device 100 is communicatively coupled to a user input control, such as through a communication wire or through a wireless interface, to allow a user to control operation of the device 100 and/or to initiate any of a variety of automated procedures, such as may be stored on a computer readable medium of the control system.

Figure 12:
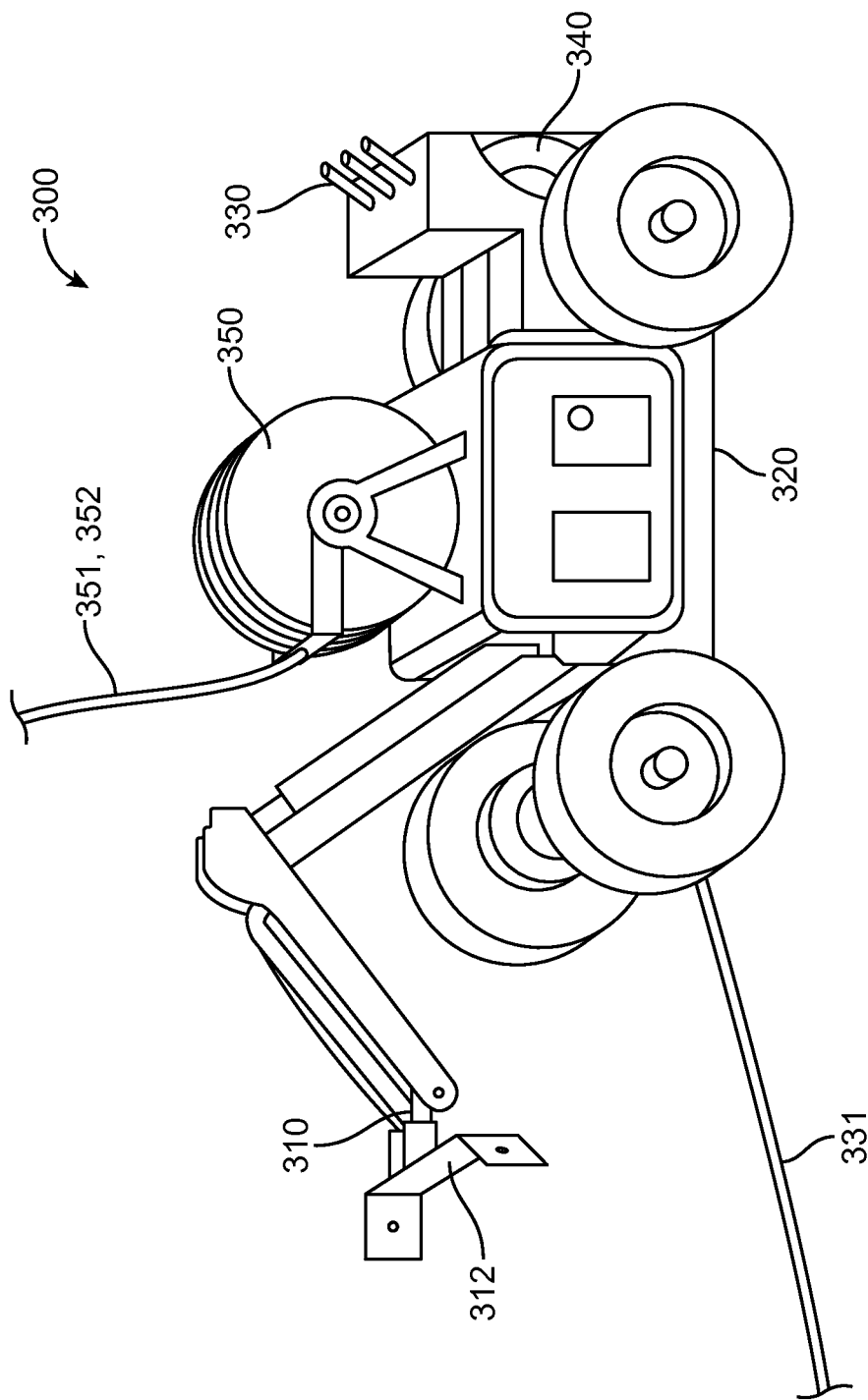
FIG. 12 illustrates a cart for use in transporting and mounting a tree trimming device on a tree trunk, in accordance with many embodiments.

FIG. 12 shows a cart 300 that may optionally be used to transport the trimming device 100, mount the trimming device on trunk 20 and to power the device during trimming and may include control mechanism 330 thereon and a power source/fluid power unit 340. An example cart 300 generally includes a movable positioning arm extending to a locking holder 312 that supports the tree trimming device. Using the hand held control 200, a user may control the powered, four wheeled cart 300 to transport the tree trimming device 100 supported in the locking holder 312 to the base of the tree trunk 20 of a tree to be trimmed. The positioning arm 310 can be extended upwards to position the tree trimming device 100 in an open configuration (see FIG. 2A) around the tree trunk 20. The locking holder 312 can then be used to move the tree trimming device 100 into a closed configuration (see FIG. 2B) so as to encircle the tree trunk 20 and mount the device to the tree trunk to facilitate climbing and trimming with the device. The cart typically includes combined cable and hose reel 350, for winding a power cable 351 and pressurization hose 352 thereon, for powering the servo motors and fluid powered actuators during climbing and trimming. The electrical power source is preferably an engine-generator set and the fluid power unit is preferably a pancake air-compressor located within the control cabinet of the cart, which is generally constructed as a self-propelled four-wheeled cart 320 so as to enable the device to be easily transported between trees.

Prior to operation, the trimmer 10 is retained by the locking holder 312 on the positioning arm 310 of the vehicle 320 and driven to a tree 20. The trimmer 10 is positioned near the base of the tree and manually opened in a clam shell manner, with the structural segment 110 closed and latched around the trunk of the tree 20. The cart 300 may be relocated away from the work site to a safe distance from the tree. The operator may use a user input control 200 communicatively coupled to the cart, such as by a co-axial cable 331 or by a wireless connection, top operate the device 100.

Figure 13A:
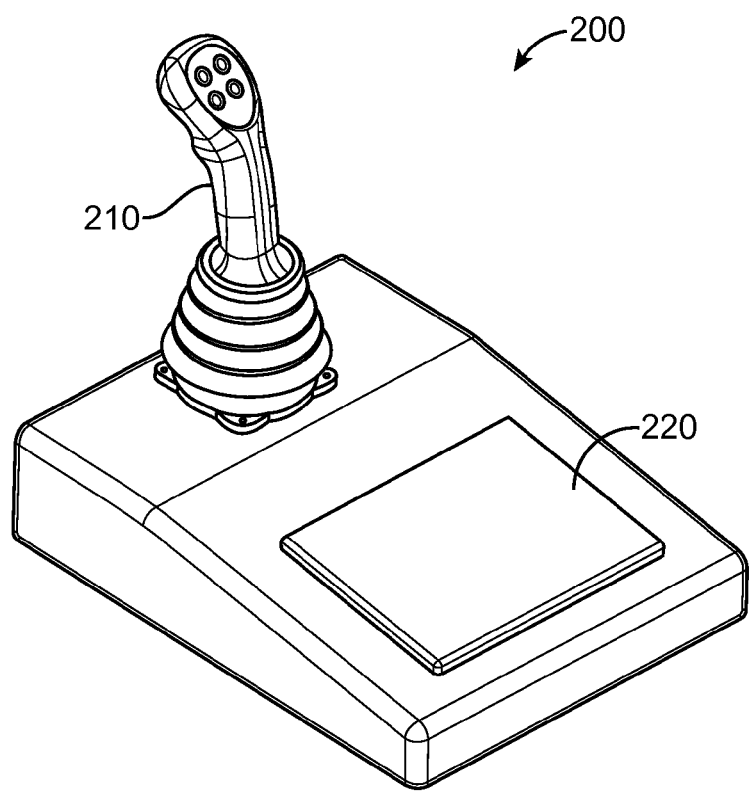
FIGS. 13A-13B illustrate a hand held control for use in controlling the tree trimming device remotely in accordance with many embodiments.
Figure 13B:
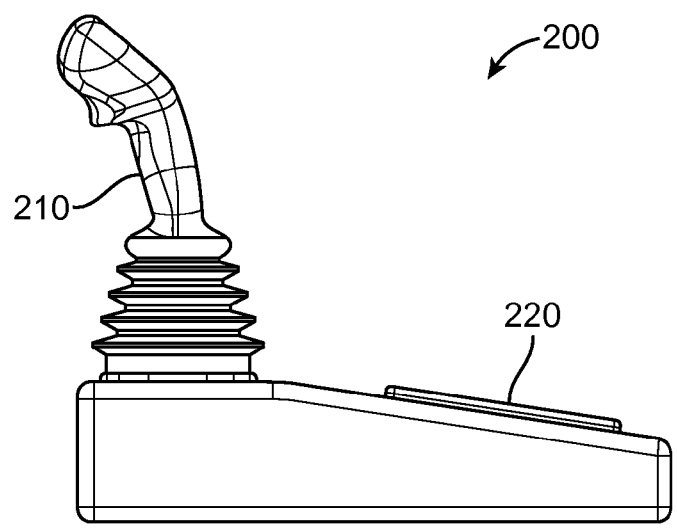

The device 100 may utilize any of a variety of user interface control devices 200 that are in communication with a multi-axis controller of the tree trimming device 100. An example of one such user input control is shown in FIGS. 13A-13B, the user input control including a joystick 210 having one or more buttons for controlling various aspects of the climbing and/or trimming and a touch screen 220 for accessing various automatic or pre-programmed trimming routines. The operator can then operate the trimmer 10 in the climbing, trimming and descending operations using the joystick 210 for control and/or the human machine interface 220 that includes a touch screen for other automatic pre-programmed trimming routines.

In one aspect, the control system is a multi-axis control system that can determine and effect movement along multiple axes, such as the Z axis (height), Y axis (depth of cut) and Theta axis (horizontal axis about the tree). Such a multi-axis control system allows for centering of the trimmer apparatus on the tree as well as leveling of the device, or optionally a pre-determined pitch or angle as desired for trimming or abrading a pattern into the tree trunk. For example, the multi-axis system may be configured to utilize independently controlled climbing carriages to effect centering control, such as centering along a radial coordinate Rho, and the driven rollers of the climbing carriages to provide improved control of climbing along the Z axis. The controls may also include a secondary Z-axis for fine motion adjustment, such as small vertical movement made during cutting of a design or logo into the tree trunk. The multi-axis system may also control depth of cut along the Y axis by any or all of: driving the ring gear at a particular speed or number of revolutions when using one or more cutting tools 135 attached to the ring gear (such as shown in FIGS. 6A and 6D); activating an actuator 174 to move an arm-mounted cutting tool 170 to engage the tree (such as in FIG. 6B); and actuating a plunge router, such as the two-axis plunge router 180 translatable along two tracks extending along a vertical and horizontal axis (such as in FIG. 6C). Coordinating movement of the trimming device along multiple axis using any or all of the above described control features provides for improved control and functionality of trimming and finishing, particularly in producing multi-dimensional designs.

In some embodiments, the device may be centered by extending one or more climbing carriages in response to a displacement measurement of one or more actuator (e.g. increased displacement of one actuator relative the other actuator pistons may be an indication that the device is not centered). Thus, the device may be configured to automatically adjust the displacement of the actuators in response to measurements of displacement to maintain centering of the device 100 mounted on the tree trunk 20. In some embodiments, the multi-axis control utilizes controllers having any or all of linear interpolation and circular interpolation so as to allow coordination between multiple axes. These aspects allow for centering of the device on the tree, leveling and/or positioning of the apparatus on the tree trunk at a variety of different elevations, angles and states (e.g. climbing velocities), thereby enabling the trimmer to follow a variety of different trimming programs, such as a programmed XYZ contour. The linear and circular interpolation may be used to execute infinitely scalable and fully repeatable movement (e.g. climbing, trimming movement). Such movement may be a pre-programmed pattern routine selected from a menu and may be automatically scaled to correspond to the diameter of the tree trunk being trimmed, the diameter determinable from the circular interpolation performed by the device (such as by measurements from actuator sensors that indicate the depth at which each climbing carriage is extended). A trimming and/or finishing design, pattern or carving may also be scaled according to an application or dimension of the tree. These designs may include totem pole type designs, symbols, logos, spiral patterns, rings, and letters of varying sizes and fonts.

In some embodiments, a simple controller can be used with the servo motors described herein to perform relatively simple actions, such as cutting thatch and cutting fronds. The multi-axis controller or controller utilizing liner and circular interpolation may be used for more complex routines that require interpolation, such as in a computer numerical control (CNC) system. A CNC system numerically directs interpolation of a tool within the work envelope of a machine, the operating parameters of which can be altered via a software load program or according to inputs from a user. In some embodiments, the operation of a cutting tool utilizes a combination of controlled movement of the trimming portion in conjunction with controlled climbing movement of the device to produce a desired pattern selected by a user.

The multi-axis control system 126 incorporates a multi-axis controller 128 disposed within a control box 190 for use with a processor having programmable instructions recorded thereon for effecting controlled movement during climbing and/or trimming using any or all of linear interpolation, circular interpolation and coordination of all axes, in addition to various pre-programmed designs. The apparatus may be controlled according to any of a variety of configuration as desired to effect both manual control, automatic control, or any combination of manual and automatic controls.

In the example control diagram shown in FIG. 14, the controller box 190 interacts with the servo motors 123, the one or more leveling sensors 129 and associated servo motor drives of each servo motor 123, 133 and also the pressure and position regulator for each fluid powered actuator 127. In some embodiments, inclinometers may be used in addition to leveling sensors. Although the control diagram indicates a separate leveling sensor for each climbing servo motor, the apparatus may utilize more or fewer leveling sensors. For example, the apparatus could include a single dual-axis leveling sensor and the climbing servo motors could be controlled manually and/or automatically in response to the output of the leveling sensor. In one aspect, a leveling sensor for each of the climbing carriages to increase accuracy and simplify the programming needed to level and/or position the apparatus. It is appreciated; however, the control diagram may include variations and modifications as would be understood by one of skill in the art.

FIGS. 15-19 illustrates a block diagram of various closed loops systems that may be used in climbing and trimming with the device in many embodiments. Such methods can be used with a tree trimming device 100 having a multi-axis system control system and multi-axis controller 300, and FIGS. 15 through 19 indicate exemplary logic for use with such as system. The closed control loops described herein may be modified, combined, or incorporated into an open loop control system in various other aspects of the device as desired.

Figure 15:
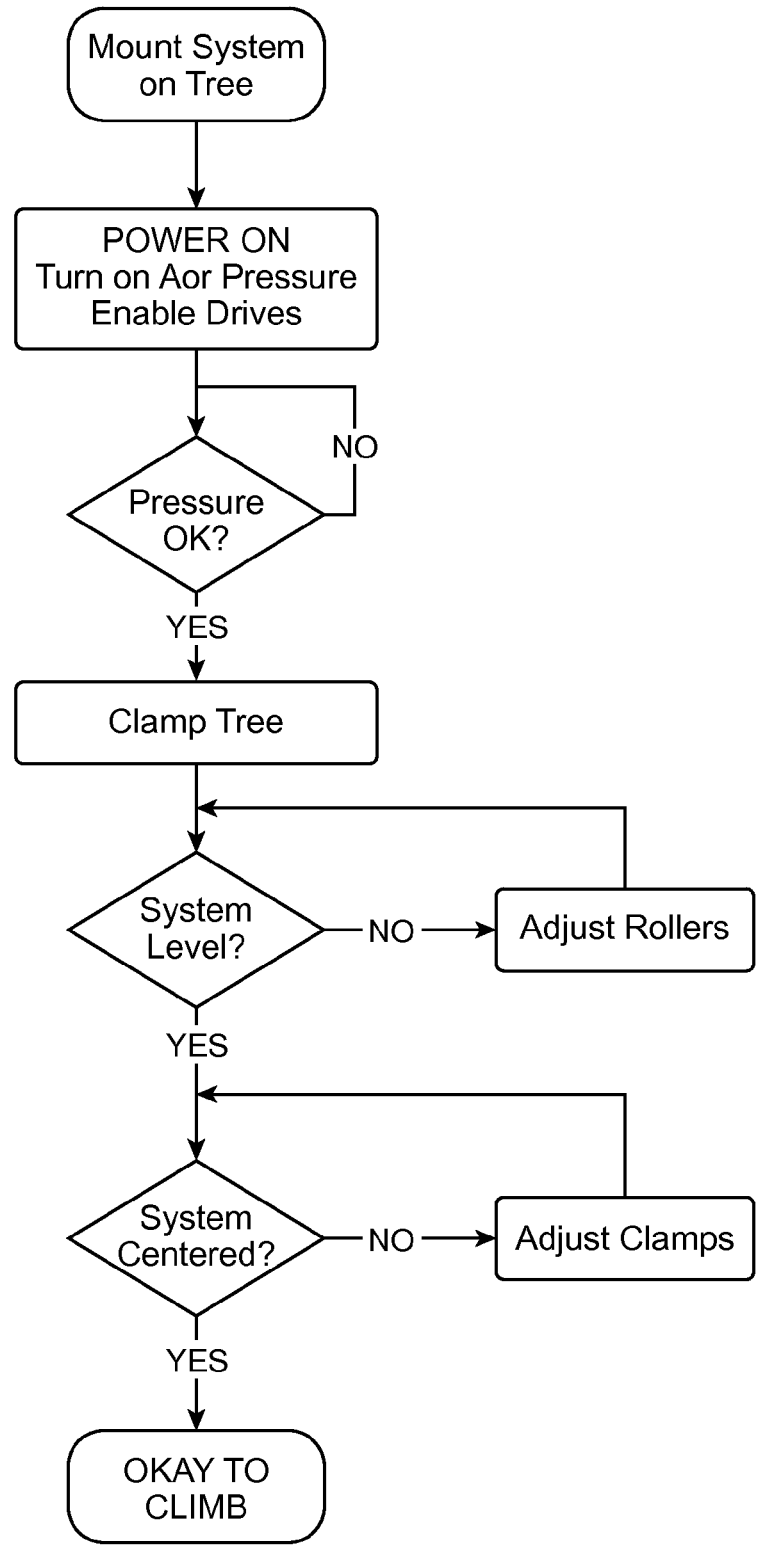
FIG. 15 is a logic flow diagram to prepare the trimmer system for climbing in accordance with many embodiments.

FIG. 15 illustrates an example method of preparing a trimming system for climbing in accordance with various embodiments. In the control loop shown in FIG. 15, the device is mounted on the tree and is powered on, including a fluid pressurization system, such as a pancake air compressor, for powering the actuators for inwardly extending the climbing carriages towards the tree trunk. If the pressure supplied to each climbing carriage actuator is within suitable range, the pneumatic cylinder actuators move the climbing carriages toward the tree to engage the tree trunk and clamp the device to the tree. Once clamped, if the leveling sensors indicate that the device is not mounted level, then the servos are used to adjust the rollers of one or more climbing carriages. Once the leveling sensor indicates that the device is level, then the actuator sensors may be used to determine, such as through linear and/or circular interpolation, whether the system is centered on the tree trunk. If not centered, the system adjusts the clamping by moving the actuators of one or more carriages until the system indicates that the device is centered. Although here, the control loop is described as adjusting for level before adjusting for centering, the control loop may include many variations, such as adjusting for centering before adjusting for leveling or these loops may be effected simultaneously. Once the system parameters indicate that the device is level and centered on the tree, the system is ready to climb. The system may then proceed to perform an automated trimming routine or a manual trimming routine directed by a user input control, as desired.

Figure 16:
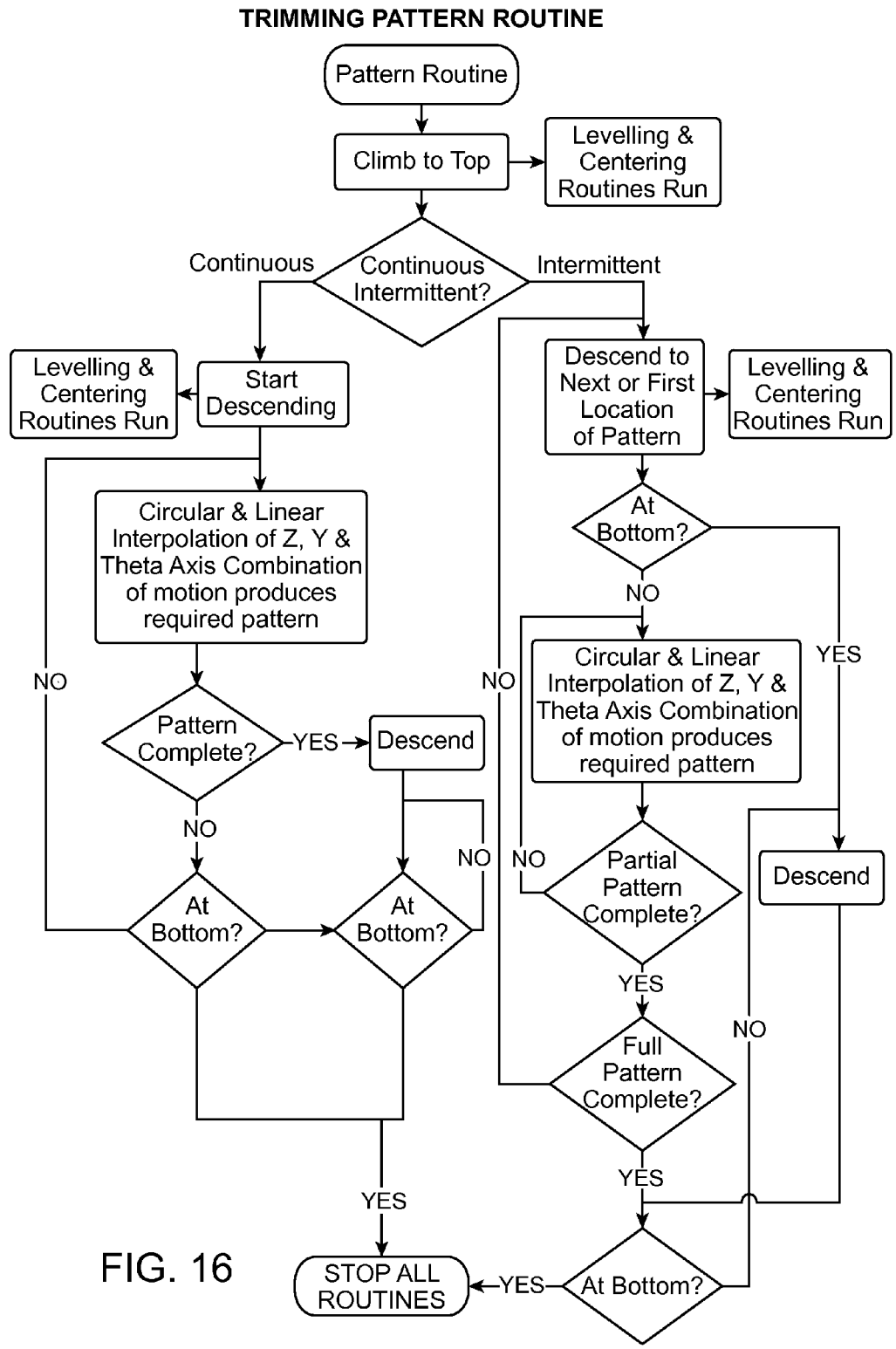
FIG. 16 is a system logic flow diagram for a trimming pattern routine in accordance with many embodiments.

FIG. 16 is a system logic flow diagram for a pre-programmed trimming pattern routine. In the control loops shown in FIG. 16, the system operates the climbing portion and trimming portion in combination to effect continuous or intermittent patterns. Once the system is mounted and ready to climb, such as by performing the control loop in FIG. 15, a pre-programmed pattern may be employed. In this example, the pattern begins by climbing to the top of the tree trunk. Once at the top, the system perform a leveling and centering routing (such as was performed in the control loop of FIG. 15), before proceeding with the selected pattern upon descending the tree.

If the pattern selected is continuous, such as a spiral cut or uniform sanding of the tree trunk, the system effects a controlled descent of the device using the servos driving the rollers of each climbing carriage. Depending on the desired pattern, the trimming portion is driven so as to engage the tree trunk, which may include driving the ring gear to engage the tree trunk with one or more cutting tools, pivoting an arm having a cutting tool thereon to engage the tree trunk, activating a plunge router, or other trimming or finishing tools. The system then utilizes circular and linear interpolation of the Z, Y and Theta Axis to effect a coordinated movement between the trimming and climbing portions to produce the desired pattern. For example, if a spiral pattern is desired, the ring gear may be driven at a particular speed during descent so that cutting tools engaged with the tree trunk carve spiral grooves into the tree trunk as the device descends. These loops continues until the pattern is complete after which the device descends until reaching the bottom of the tree trunk, after which the routines are stopped.

If the pattern selected is intermittent, such as a series of rings or intermittent carvings, the device descends to the first location of where the pattern begins and performs the leveling and centering routing. If not at the bottom of the portion of the patterned portion, the system performs circular and linear interpolation of the Z, Y and Theta axis to effect a coordinated movement between the trimming portion and the climbing portion to produce the desired pattern until that discrete portion of the pattern is complete (e.g. a first ring of a series of rings). The device then descends to the next location and performs the same procedure to effect another portion of the intermittent pattern (e.g. a second ring) and repeats the procedure (e.g. third, fourth and fifth rings), until the full pattern is complete (e.g. a five ring pattern) is complete, after which the device descends to the bottom of the tree and the routines are stopped.

Figure 17:
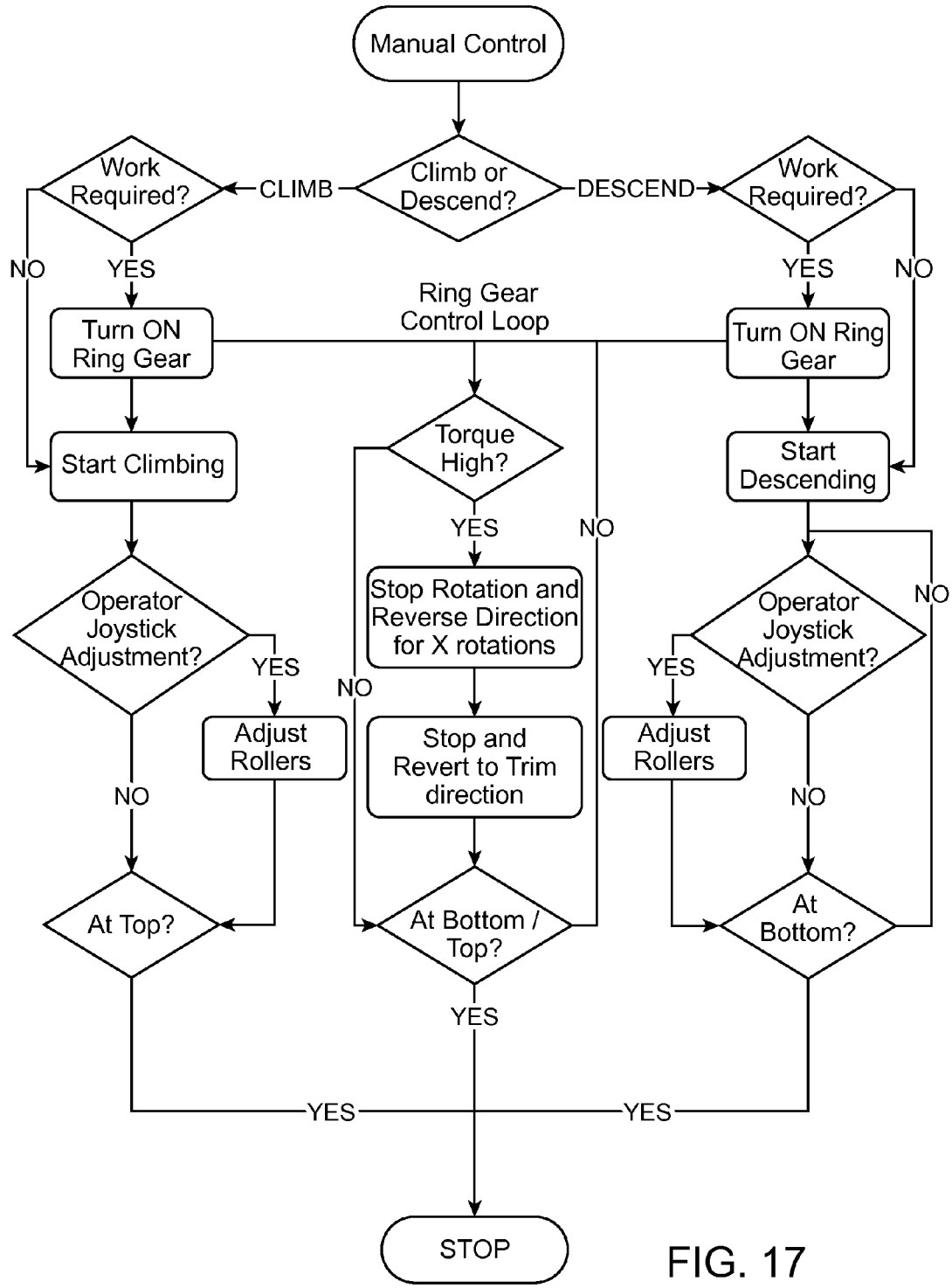
FIG. 17 is a system logic flow diagram for a manual climbing/descending routine in accordance with many embodiments.

FIG. 17 is a system logic flow diagram for a manual climbing/descending routine. In the control loop of FIG. 17, the user can manually effect climbing or descent of the device using a user input control, such as a joystick, to perform work at a desired location on the tree trunk. Work may include any of the trimming and/or finishing procedure described herein. In this example, the work is performing with a trimming portion that utilizes a driven ring gear. When performing work during climbing, the system utilizes the leftmost control loop shown in FIG. 17, and when performing work during descent of the device, the system utilizes the rightmost control loop shown in FIG. 17. When initiating work, the system utilizes the ring gear control loop in the center of FIG. 17 until the work is completed, or until the device reaches the top of the tree trunk when climbing or the bottom when descending, respectively. In some embodiments, the user may also initiate a pre-programmed routine or may utilize various other means of performing work using various other cutting tools, such as a chainsaw, reciprocating or circular blade, or plunge router.

Figure 18:
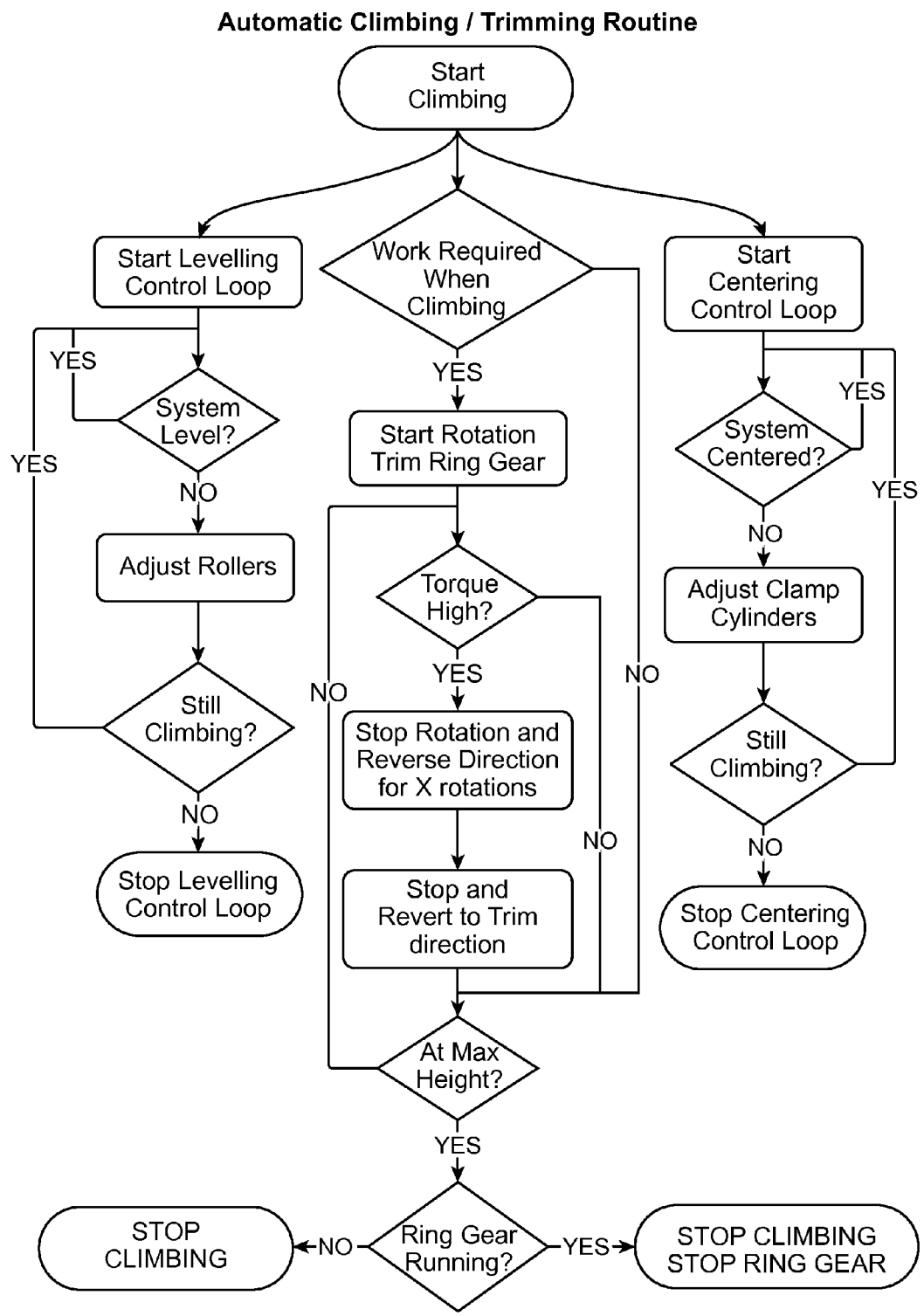
FIG. 18 is a system logic flow diagram for an automatic climbing/trimming routine in accordance with many embodiments.

FIG. 18 is a system logic flow diagram for an automatic climbing/trimming routine. In the control loop of FIG. 18, the system performs an automatic trimming routine using a trimming portion having a ring gear while climbing with the device. Once climbing is initiated, the system using the leveling control loop, shown at left in FIG. 18, repeatedly while climbing to maintain level in addition to using the centering control loop, shown at right in FIG. 18, repeatedly while climbing to maintain centering. These control loops may be performed continuously, intermittently, simultaneously and/or sequentially with each other or with the work control loop, shown at center in FIG. 18, until the device completes the work or until the device reaches the maximum height. Similar control loops may be used with a device having a trimming portion utilizing various other cutting tools, as described herein.

Figure 19:
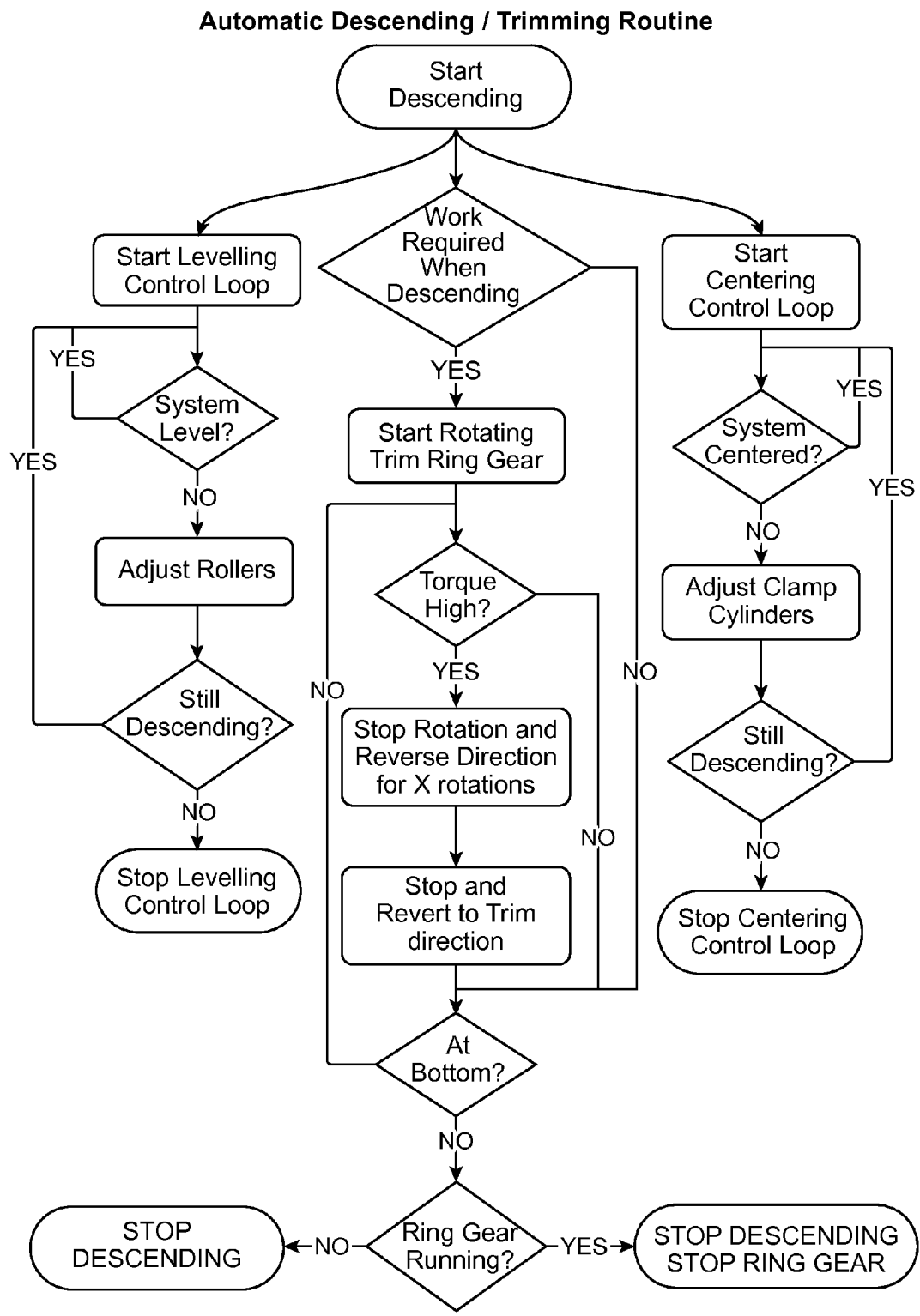
FIG. 19 is a system logic flow diagram for an automatic descending/trimming routine in accordance with many embodiments.

FIG. 19 is a system logic flow diagram for an automatic descending/trimming routine. In the control loop of FIG. 19, the system performs an automatic trimming routine using a trimming portion having a ring gear while descending the tree trunk with the device. Once descent is initiated, the system using the leveling control loop, shown at left in FIG. 19, repeatedly while climbing to maintain level in addition to using the centering control loop, shown at right in FIG. 19, repeatedly while descending to maintain centering. These control loops may be performed continuously, intermittently, simultaneously and/or sequentially with each other or with the work control loop, shown at center in FIG. 19, until the device complete the work or until the device reaches the bottom of the tree trunk. Similar control loops may be used with a device having a trimming portion utilizing various other cutting tools, including various other cutting tools, as described herein.

Figure 20:
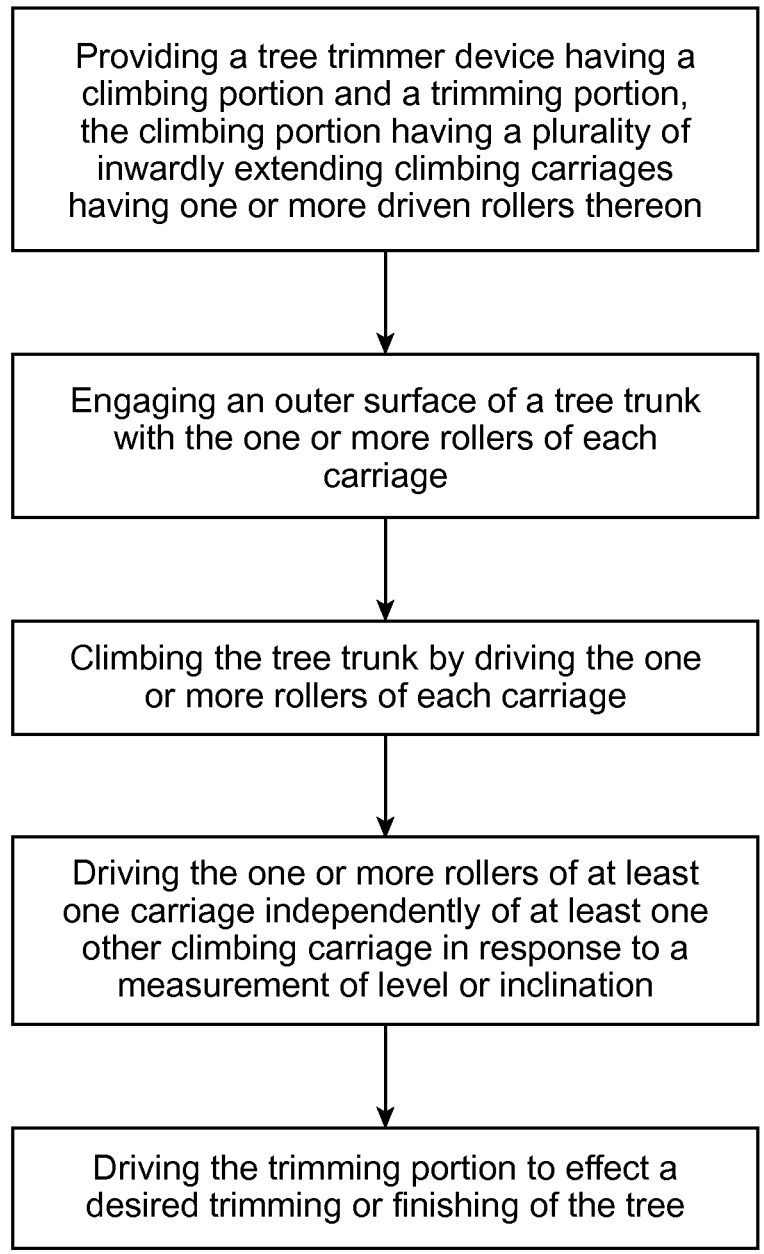
FIG. 20 is a flowchart showing methods of using a tree trimming device in accordance with many embodiments in accordance with many embodiments.

FIG. 20 is an example method of trimming or finishing a tree using a tree trimming device, as described herein. The example methods includes: providing a tree trimmer device having a climbing portion and a trimming portion, the climbing portion having a plurality of inwardly extending climbing carriages having one or more driven rollers thereon; engaging an outer surface of a tree trunk with the one or more rollers of each carriage; climbing the tree trunk by driving the one or more rollers of each carriage; driving the one or more rollers of at least one carriage independently of at least one other climbing carriage in response to a measurement of level or inclination, and driving the trimming portion to effect a desired trimming or finishing of the tree. The method may include one or more of the control loops, such as the centering control loops, or trimming control loops described above in FIGS. 16-18, and may further include any of the trimming and/or finishing processes described herein and obvious variants thereof.

While the invention has been described in detail and pictorially shown in the accompanying drawings, it is not to be limited to such details, since many changes and modifications may be made without departing from the spirit and scope of the invention. Hence, it is described to cover any and all modifications and forms that may come within the language and scope of the appended claims.

What is claimed:

1. A self-climbing tree trimmer for shaping and severing peripheral growth from a living tree, said tree trimmer comprising:
   a rigid frame attached to a split-top plate moveable between an open configuration and a closed configuration, wherein in the open configuration, a trunk of the tree is receivable within the frame attached to the split-top plate, and wherein in the closed configuration, the frame and attached split-top plate define a central passageway through which the trunk extends when positioned thereon such that the split-top plate extends along a horizontal plane and along with the rigid frame substantially encircles the tree trunk;
   a climbing portion comprising a plurality of inwardly extending climbing carriages slidably interfaced with the frame and distributed about the central passageway, wherein each of the climbing carriages is slidable along a linear bearing slide attached to the frame and extending along a horizontal axis such that the climbing carriage is axially extendable along the horizontal axis toward the central passageway with an actuator attached to the frame, the actuator comprising an elongate member that is elongate and axially extendable along the horizontal axis, wherein each climbing carriage includes a vertically extending roller frame having at least two driven rollers mounted thereon for engaging a surface of the tree trunk when the carriage is axially extended toward the central passageway, the at least two driven rollers being configured for climbing and descending the tree trunk, wherein the plurality of climbing carriages comprises at least three climbing carriages, each being slidable and inwardly extendable independently of each other upon actuation of their respective actuator;
   a trimming portion attached to the frame and moveable relative to the frame, wherein the trimming portion is rotationally driven and includes one or more cutting tools;
   one or more drive assemblies for driving the trimming portion and the at least two rollers of each carriage of the climbing portion and the trimming portion; and
   a control system for effecting and coordinating actuation of the actuators and driving of the at least two rollers of the climbing portion and the trimming portion.

2. The self-climbing tree trimmer of claim 1, wherein each respective roller frame is pivotally coupled with its respective actuator at a horizontal pivot coupling such that pivotal movement of the roller frame at the horizontal pivot couple engages the at least two rollers with the tree trunk when the roller frame is axially extended to the tree trunk.

3. The self-climbing tree trimmer of claim 1, wherein the at least two rollers are vertically spaced apart on each respective roller frame by a set vertical separation distance.

4. The self-climbing tree trimmer of claim 3, wherein the vertical separation distance is between 8 inches and 24 inches.

5. The self-climbing tree trimmer of claim 1, wherein the at least two rollers of each roller frame comprise three rollers distributed along a vertical axis of the roller frame.

6. The self-climbing tree trimmer of claim 1, wherein the at least two rollers comprise an upper-most roller and a bottom roller on the respective roller frame and the elongate member couples with the roller frame above a mid-point of a vertical separation distance between the upper-most roller and the bottom roller.

7. The self-climbing tree trimmer of claim 1, wherein the actuator comprises a hydraulic cylinder and the elongate member comprises a piston of a fluid powered cylinder.

8. The self-climbing tree trimmer of claim 7, wherein each actuator comprises an actuator sensor having an actuator sensor output coupled with the control system and configured for use as feedback in regulating extension of each actuator.

9. The self-climbing tree trimmer of claim 1, wherein the one or more drive assemblies include a plurality of servo motors, wherein each of the climbing carriages includes a servo motor of the plurality of servo motors that is drivingly coupled with the at least two rollers of the roller frame of the respective climbing carriage.

10. The self-climbing tree trimmer of claim 1, further comprising:
one or more leveling sensors attached to the rigid frame, the one or more leveling sensor having a leveling sensor output coupled to the control system and configured so that one or more servo motors of the one or more climbing carriages are driven in response to the output.

11. The self-climbing tree trimmer of claim 1, wherein each roller of the at least two rollers has an increased diameter near opposing ends so as to conform to the tree trunk when engaged thereon.

12. The self-climbing tree trimmer of claim 1, wherein the trimming portion includes a split ring gear rotatably coupled with the rigid frame such that driving the split ring gear with the one or more driving assemblies engages the cutting tools with the tree trunk when extending through the central passageway.

13. The self-climbing tree trimmer of claim 12, wherein the cutting tools are pivotally coupled to the split ring gear and centrifugally managed such that driving of the split ring gear pivots the cutting tools from a non-cutting position to a cutting position.

14. The self-climbing tree trimmer of claim 12, wherein the cutting tools comprise a plurality of spring-loaded trimming blade members affixed to the ring gear, such that when the ring gear is driven, the blade members unlatch and pivot, with spring pressure, into the tree trunk, thereby causing controlled trimming based on the speed at which the ring gear is driven and/or the number of revolutions at a particular location on the tree trunk.

15. The self-climbing tree trimmer of claim 1, wherein the cutting tools comprise a plurality of removable and interchangeable blades that are configured according to one or more respective functions including: slicing, cutting, carving, abrading, sanding, peeling, rasping and finishing.

16. The self-climbing tree trimmer of claim 1, wherein the cutting tools include a plurality of differing tools selectable by a user, the differing tools associated with one or more differing functions including: slicing, cutting, carving, abrading, sanding, peeling, rasping and finishing.

17. The self-climbing tree trimmer of claim 1, wherein the trimming portion comprises an angularly positionable arm having a cutting tool disposed thereon, the cutting tool comprising a chain saw, circular saw, or reciprocating blade.

18. The self-climbing tree trimmer of claim 1, wherein the trimming portion includes a two axis plunge-router configured to engage the tree trunk to create a logo or design on the tree trunk that is visually recognizable from the ground.

19. The self-climbing tree trim of claim 17, wherein the trimming portion further includes a rotationally driven ring gear having a plurality of cutting tools disposed thereon such that rotationally driving the ring gear causes the plurality of cutting tools to cuttingly engage the tree.

20. The self-climbing tree trimmer of claim 1, wherein the control system is configured to drive the climbing portion and/or the trimming portion or regulate the actuator in response to a user input command from a user input device.

21. The self-climbing tree trimmer of claim 1, wherein the control system is configured to drive the climbing portion and/or the trimming portion or regulate the actuator based on a sensor output of one or both of an actuator sensor and a leveling sensor.

22. The self-climbing tree trimmer of claim 1, wherein the control system includes a processor having programmable instructions recorded thereon for determining a position and/or an orientation of the tree trimmer in response to a sensor output from one or more sensors, and wherein the control system is configured to drive the climbing portion and/or the trimming portion in response to the calculated position and/or the orientation of the tree trimmer.

23. The self-climbing tree trimmer of claim 1, wherein the control system includes a processor having programmable instructions recorded thereon for calculating the position and/or orientation of the tree trimmer based on a sensor output and any or all of: linear interpolation, circular interpolation and coordination of multiple axes.

24. The self-climbing tree trimmer of claim 1, wherein the control system is configured to drive the climbing portion and/or the trimming portion based on a command from a user input device, a sensor output, a calculated position and/or orientation, a pre-determined program for effecting a trimming design, or any combination thereof.

25. The self-climbing tree trimmer of claim 1, wherein the control system is coupled with each actuator of each carriage of the plurality, wherein each actuator includes a sensor for measuring an actuator pressure and/or an extension distance by which the respective elongate member extends, and wherein the control system is configured to regulate the actuator pressure and/or the extension distance of at least one of the actuators in response to a measurement of the actuator pressure and/or the extension distance of one or more of the remaining actuators.

26. The self-climbing tree trimmer of claim 1, wherein the control system is further configured to regulate the one or more driving assemblies to effect a coordinated movement of the climbing portion and the trimming portion according to a pre-programmed XYZ contour recorded on a recordable medium of the control system.

27. The self-climbing tree trimmer of claim 1, further comprising:
a user input device coupled with the control system, wherein the user input device comprises any or all of:
a hand-held multi-function joystick, and
a touchscreen user interface for selecting pre-programmed instructions.

28. The self-climbing tree trimmer of claim 1, further comprising:
a trimmer positioning cart having a movable positioning arm for supporting the tree trimmer and positioning the tree trimmer on the tree trunk.

29. A self-climbing tree trimmer for shaping and severing peripheral growth from a living tree, said tree trimmer comprising:
a rigid frame moveable between an open configuration and a closed configuration, wherein in the open configuration, a trunk of the tree is receivable within the frame, and wherein in the closed configuration, the frame defines a central passageway through which the trunk extends when positioned thereon such that the frame substantially encircles the tree trunk;
a climbing portion comprising a plurality of inwardly extending climbing carriages coupled with the frame and distributed about the central passageway, wherein each of the climbing carriages is attached to the rigid frame and slidable along a horizontal axis such that a roller frame of the climbing carriage is axially extendable along the horizontal axis toward the central passageway with an actuator, wherein each roller frame includes at least two driven rollers attached thereto that are spaced vertically apart by a set distance, the at least two driven rollers adapted for engaging an outer surface of the tree trunk when the roller frame is axially extended toward the central passageway, the at least two rollers being configured for climbing and descending the tree trunk;

a trimming portion attached to the frame and moveable relative the frame so as to contact the tree trunk or adjacent peripheral growth of the tree to effect cutting, severing or trimming of the tree trunk or peripheral growth, wherein the trimming portion comprises any or all of:

one or more centrifugally managed trimming blade members pivotally coupled to a ring gear, one or more trimming blade members coupled to and extending upwardly from a ring gear, a two-axis plunge router coupled to and moveable relative to the frame, a rotating circular saw or reciprocating saw disposed on an upwardly extending arm coupled to the frame, and a chain saw disposed on an upwardly extending arm coupled to the frame;

one or more drive assemblies for driving the trimming portion and the at least two rollers of each carriage of the climbing portion and the trimming portion; and a control system for effecting and coordinating actuation of the actuators and driving of the at least two rollers of each carriage of the climbing portion and the trimming portion.

30. A self-climbing tree trimmer for shaping and severing peripheral growth from a living tree, said tree trimmer comprising:

a rigid frame moveable between an open configuration and a closed configuration, wherein in the open configuration, a trunk of the tree is receivable within the frame, and wherein in the closed configuration, the frame defines a central passageway through which the trunk extends when positioned thereon such that the frame substantially encircles the tree trunk;

a climbing portion comprising at least three inwardly extending climbing carriages coupled with the rigid frame and distributed about the central passageway, wherein each of the three inwardly extending climbing carriages comprises a vertically-extending roller frame and is slidably coupled with the rigid frame along a horizontal axis such that the roller frame is axially extendable along the horizontal axis toward the central passageway with an actuator and wherein each roller frame includes at least two driven rollers attached to the roller frame and spaced vertically apart by a set distance, the driven rollers being adapted for engaging an outer surface of the tree trunk when the roller frame is axially extended toward the central passageway, the at least two rollers being configured for climbing and descending the tree trunk;

a trimming portion attached to the frame and moveable relative the frame so as to contact the tree trunk or adjacent peripheral growth of the tree to effect cutting, severing or trimming of the tree trunk or peripheral growth;

one or more drive assemblies for driving the trimming portion and the at least two rollers of each carriage of the climbing portion and the trimming portion; and a control system for effecting and coordinating actuation of the actuators and driving of the at least two rollers of each climbing carriage of the climbing portion and the trimming portion.

* * * * *